United States Patent
Ohta et al.

(10) Patent No.: US 11,546,895 B2
(45) Date of Patent: Jan. 3, 2023

(54) WIRELESS COMMUNICATION METHOD, WIRELESS COMMUNICATION SYSTEM, WIRELESS TERMINAL, AND WIRELESS BASE STATION FOR ENHANCED PHYSICAL DOWNLINK CONTROL CHANNEL

(71) Applicant: FUJITSU LIMITED, Kawasaki (JP)

(72) Inventors: Yoshiaki Ohta, Yokohama (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 14/633,265

(22) Filed: Feb. 27, 2015

(65) Prior Publication Data
US 2015/0173054 A1 Jun. 18, 2015

Related U.S. Application Data

(63) Continuation of application No. PCT/JP2012/006034, filed on Sep. 21, 2012.

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01)

(58) Field of Classification Search
None
See application file for complete search history.

(56) References Cited

U.S. PATENT DOCUMENTS

| | | | |
|---|---|---|---|
| 2009/0003477 A1* | 1/2009 | Nishio | H04L 5/0053 375/260 |
| 2011/0170496 A1* | 7/2011 | Fong | H04L 5/0053 370/329 |
| 2013/0039284 A1* | 2/2013 | Marinier | H04L 5/001 370/329 |

(Continued)

FOREIGN PATENT DOCUMENTS

| | | |
|---|---|---|
| CN | 102624489 A | 8/2012 |
| JP | 2012-508483 A | 4/2012 |

(Continued)

OTHER PUBLICATIONS

3GPP TS36.211 V11.0.0; Technical Specification, 3rd Generation Partnership Project; Technical Specification Group Radio Access Network; Evolved Universal Terrestrial Radio Access (E-UTRA); Physical Channels and Modulation (Release 11), Sep. 2012.

(Continued)

*Primary Examiner* — Hong Shao
(74) *Attorney, Agent, or Firm* — Myers Wolin, LLC

(57) ABSTRACT

A wireless communication method including: transmitting, from a base station, a signal in a second control channel that is used for transmitting information indicating a resource of first resource information indicating a resource of a first control channel, and receiving, by a wireless terminal, second resource information that indicates the resource of the first control channel and that is transmitted from the wireless base station before a transmission of the second control channel from the wireless base station to the wireless terminal.

9 Claims, 17 Drawing Sheets

(56) References Cited

U.S. PATENT DOCUMENTS

| | | | | |
|---|---|---|---|---|
| 2013/0044692 A1* | 2/2013 | Nory | H04L 25/0228 | 370/329 |
| 2013/0064119 A1* | 3/2013 | Montojo | H04W 36/0061 | 370/252 |
| 2013/0183987 A1* | 7/2013 | Vrzic | H04L 1/0046 | 455/450 |
| 2013/0242882 A1* | 9/2013 | Blankenship | H04W 72/042 | 370/329 |
| 2013/0301597 A1* | 11/2013 | Kim | H04W 72/042 | 370/329 |
| 2013/0336279 A1* | 12/2013 | Kim | H04L 5/0094 | 370/329 |
| 2014/0003379 A1* | 1/2014 | Kang | H04L 5/0053 | 370/329 |
| 2014/0036747 A1* | 2/2014 | Nory | H04W 72/0406 | 370/311 |
| 2014/0226610 A1* | 8/2014 | Nguyen | H04L 5/001 | 370/329 |

FOREIGN PATENT DOCUMENTS

| | | | | |
|---|---|---|---|---|
| JP | 2014-527341 A | 10/2014 | | |
| KR | WO 2012102510 A2 * | 8/2012 | | H04W 72/042 |
| WO | 2007/080892 A1 | 7/2007 | | |
| WO | 2010/053984 A2 | 5/2010 | | |
| WO | 2011/085192 A1 | 7/2011 | | |
| WO | 2011/137383 A1 | 11/2011 | | |
| WO | 2012/109542 A1 | 8/2012 | | |
| WO | 2013/025302 A1 | 2/2013 | | |

OTHER PUBLICATIONS

3GPP TS36.212 V11.0.0; Technical Specification; 3rd Generation Partnership Project; Technical Specification Group Radio Access Network; Evolved Universal Terrestrial Radio Access (E-UTRA); Multiplexing and channel coding (Release 11), Sep. 2012.
3GPP TS36.213 V11.0.0;Technical Specification; 3rd Generation Partnership Project; Technical Specification Group Radio Access Network; Evolved Universal Terrestrial Radio Access (E-UTRA); Physical layer procedures (Release 11), Sep. 2012.
Nokia, "Motivations and scenarios for ePDCCH", Agenda Item: 7.5.5.2, 3GPP TSG RAN WG1 Meeting #66bis, R1-113155, Zhuhai, China, Oct. 10-14, 2011.
Intel et al., "WF on ePDCCH search space", Agenda Item: 7.6.3, 3GPP TSG-RAN WG1 Meeting #70, R1-123XXX, Qingdao, China, Aug. 13-17, 2012.
International Search Report issued for corresponding International Patent Application No. PCT/JP2012/006034, dated Oct. 16, 2012, with an English translation.
NEC Group, "PRB indication to UE for ePDCCH transmission", Agenda Item: 7.6.2, 3GPP TSG RAN WG1 Meeting #70, R1-123252, Qingdao, China, Aug. 13-17, 2012.
Extended European search report with the supplementary European search report and the European search opinion issued for corresponding European Patent Application No. 12885129.2 dated Aug. 31, 2015.
Notification of Reasons for Refusal issued for corresponding Japanese Patent Application No. 2014-536415 dated Apr. 12, 2016 with a partial English translation.
Notice of Preliminary Rejection issued by the Korean Intellectual Property Office for corresponding Korean Patent Application No. 10-2015-7006466, dated Jun. 22, 2016, with English translation.
MCC Support, "Draft Report of 3GPP TSG RAN WG1 #70 v0.1.0 (Qingdao, China, Aug. 13-17, 2012)", Agenda Item: 3, 3GPP TSG-RAN WG1 Meeting #70bis, R1-12xxxx, San Diego, USA, Oct. 8-12, 2012.
Notice of Preliminary Rejection issued by the Korean Intellectual Property Office for corresponding Korean Patent Application No. 10-2017-7024495, dated Oct. 19, 2017, with English translation.
Huawei et al., "Remaining issues of PBCH/SIB1/Paging detection", Agenda Item: 7.3.2, 3GPP TSG RAN WG1 Meeting #70, R1-123561, Qingdao, China, Aug. 13-17, 2012.
First Notification of Office Action issued by the State Intellectual Property Office of China for corresponding Chinese Patent Application No. 201280075849.4, dated Oct. 11, 2017, with an English translation.
Notice of Second Final Rejection issued by the Korean Intellectual Property Office for corresponding Korean Patent Application No. 10-2015-7006466, dated Aug. 1, 2017, with English translation.

* cited by examiner

Prior Art

Prior Art

Prior Art

FIG. 7

| PARAMETER NAME | DESCRIPTION |
|---|---|
| dl-Bandwidth | BANDWIDTH OF DL |
| phich-Config | SETTING OF RETRANSMISSION CONTROL |
| systemFrameNumber | UPPER 8 BITS OF FRAME NUMBER |
| spare | RESERVED REGION (10 BITS) |

Prior Art

FIG. 8A

| PARAMETER NAME | DESCRIPTION |
| --- | --- |
| dl-Bandwidth | BANDWIDTH OF DL |
| phich-Config | SETTING OF RETRANSMISSION CONTROL |
| systemFrameNumber | UPPER 8 BITS OF FRAME NUMBER |
| E-PDCCH-usage | USE OR NON-USE OF ENHANCED CONTROL REGION (1 BIT) |
| E-PDCCH-space | RESOURCE OF ENHANCED CONTROL SIGNAL REGION (3 BITS) |
| spare | RESERVED REGION (6 BITS) |

FIG. 8B

| BAND FREQUENCY | | 1.4M | 3M | 5M | 10M | 15M | 20M |
| --- | --- | --- | --- | --- | --- | --- | --- |
| NUMBER OF RESOURCE BLOCKS | | 6 | 15 | 25 | 50 | 75 | 100 |
| VALUE OF E-PDCCH-space | 000 | 1 | 1 | 1 | 1 | 1 | 1 |
| | 001 | 2 | 3 | 5 | 8 | 11 | 14 |
| | 010 | 3 | 5 | 8 | 14 | 20 | 26 |
| | 011 | 4 | 7 | 11 | 20 | 30 | 39 |
| | 100 | 5 | 9 | 14 | 26 | 39 | 51 |
| | 101 | 6 | 11 | 17 | 33 | 48 | 64 |
| | 110 | N/A | 13 | 20 | 39 | 58 | 76 |
| | 111 | N/A | 15 | 23 | 45 | 67 | 89 |

FIG. 10A

| PARAMETER NAME | DESCRIPTION |
|---|---|
| dl-Bandwidth | BANDWIDTH OF DL |
| phich-Config | SETTING OF RETRANSMISSION CONTROL |
| systemFrameNumber | UPPER 8 BITS OF FRAME NUMBER |
| E-PDCCH-spare | RESOURCE OF ENHANCED CONTROL SIGNAL REGION (4 BITS) |
| spare | RESERVED REGION (6 BITS) |

FIG. 10B

| BAND FREQUENCY | | 1.4M | 3M | 5M | 10M | 15M | 20M |
|---|---|---|---|---|---|---|---|
| NUMBER OF RESOURCE BLOCKS | | 6 | 15 | 25 | 50 | 75 | 100 |
| VALUE OF E-PDCCH-space | 0001 | 1 | 1 | 1 | 1 | 1 | 1 |
| | 0010 | 2 | 2 | 3 | 4 | 6 | 8 |
| | 0011 | 3 | 3 | 4 | 8 | 11 | 15 |
| | 0100 | 4 | 4 | 6 | 11 | 16 | 22 |
| | 0101 | 5 | 5 | 8 | 15 | 21 | 29 |
| | 0110 | 6 | 6 | 9 | 18 | 26 | 36 |
| | 0111 | N/A | 7 | 11 | 22 | 31 | 43 |
| | 1000 | N/A | 8 | 13 | 25 | 36 | 50 |
| | 1001 | N/A | 9 | 14 | 29 | 41 | 57 |
| | 1010 | N/A | 10 | 16 | 32 | 46 | 64 |
| | 1011 | N/A | 11 | 18 | 36 | 51 | 71 |
| | 1100 | N/A | 12 | 19 | 39 | 56 | 78 |
| | 1101 | N/A | 13 | 21 | 43 | 61 | 85 |
| | 1110 | N/A | 14 | 23 | 46 | 66 | 92 |
| | 1111 | N/A | 15 | 24 | 50 | 70 | 99 |

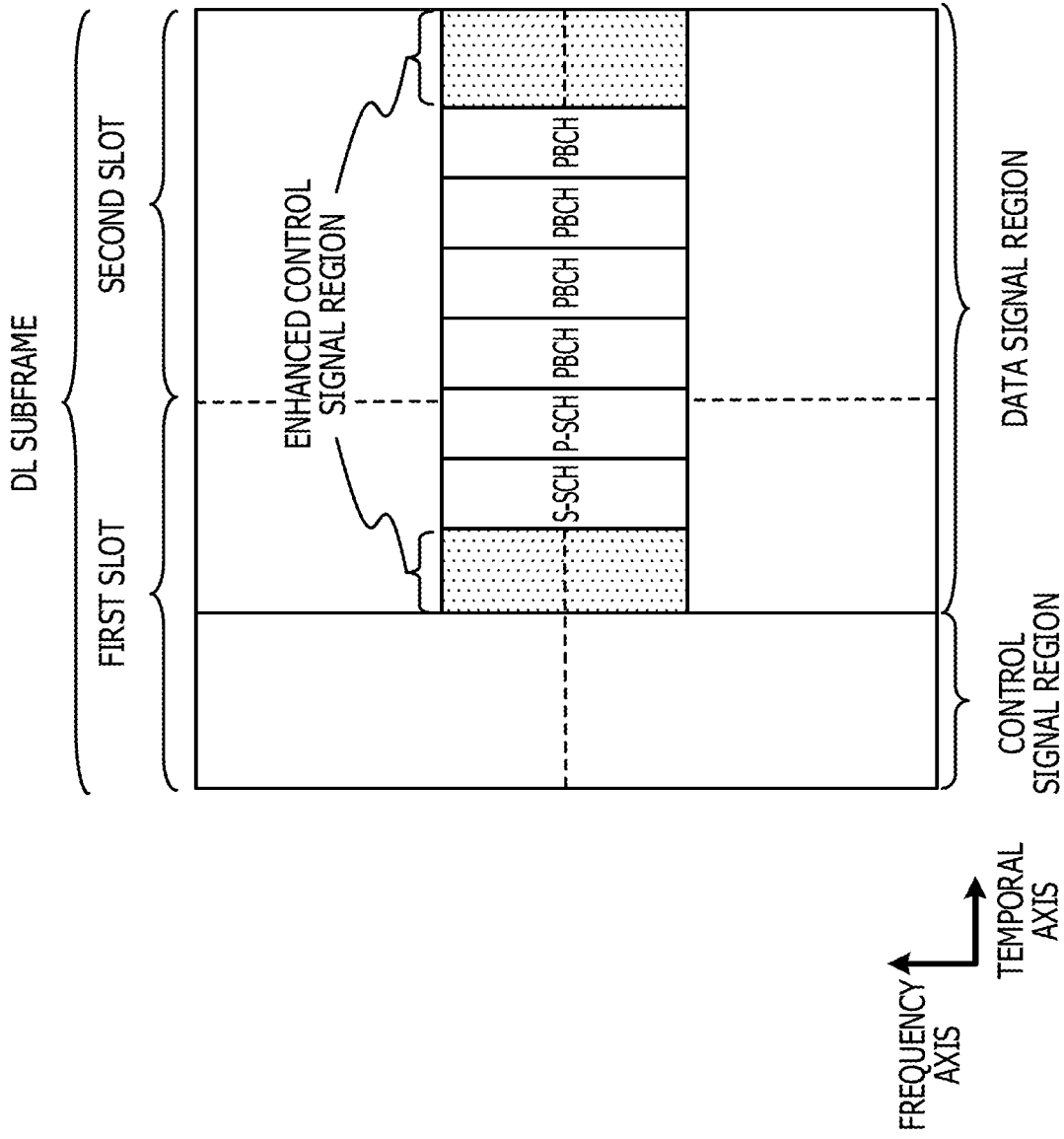

WIRELESS COMMUNICATION METHOD, WIRELESS COMMUNICATION SYSTEM, WIRELESS TERMINAL, AND WIRELESS BASE STATION FOR ENHANCED PHYSICAL DOWNLINK CONTROL CHANNEL

CROSS-REFERENCE TO RELATED APPLICATION

This application is a continuation application of International Application PCT/JP2012/006034 filed on Sep. 21, 2012, the entire contents of which are incorporated herein by reference.

FIELD

The present invention relates to a wireless communication method, a wireless communication system, a wireless terminal, and a wireless base station.

BACKGROUND

In recent years, in wireless communication systems such as mobile phone systems (cellular systems), in order to further increase the speed, capacity, and so forth of wireless communication, a next-generation wireless communication technology has been discussed. For example, in 3GPP (3rd Generation Partnership Project) serving as a standardization body, a communication standard called LTE (Long Term Evolution) and a communication standard based on the wireless communication technology of LTE and called LTE-A (LTE-Advanced) have been proposed.

The latest communication standard completed in 3GPP is Release 10 compatible with LTE-A, and this is obtained by substantially expanding the functions of Release 8 and Release 9 compatible with LTE. Currently, discussion is advanced to the completion of Release 11 to which Release 10 is further expanded. Hereafter, unless otherwise noted, it is assumed that "LTE" includes other wireless communication systems to which LTE is expanded, in addition to LTE and LTE-A.

In Release 11 of 3GPP, various technologies have been discussed. Thereamong, problem has been raised for a control signal of a downlink wireless frame, and vigorous discussions have been conducted thereon. Here, the outline thereof will be described. In addition, hereinafter, a wireless link in a direction headed from a wireless terminal to a wireless base station will be called an uplink (UL: UpLink), and a wireless link in a direction headed from the wireless base station to the wireless terminal will be called a downlink (DL: DownLink).

First, in FIG. 1, the format of a DL subframe ranging to Release 10 of 3GPP is illustrated. Basically, in a time region, transmission of a data signal aimed at a wireless terminal is performed in units of subframes. The wireless link of DL is constructed on an OFDM (Orthogonal Frequency Division Multiplexing) signal. In FIG. 1 and FIG. 2 described later, a lateral direction (right-hand direction) indicates a frequency axis, and a longitudinal direction (downward direction) indicates a temporal axis. The DL subframe is divided into two slots slot (a first slot and a second slot) in a temporal axis direction. For example, the length of the DL subframe is 1 millisecond, and the length of one slot is 0.5 milliseconds.

In addition, the DL subframe is divided into a control signal region of a specific length (n OFDM symbols: n={1, 2, 3}) ranging from the frontend thereof in the temporal axis direction and a data signal region of a remaining region. The control signal region is a region in which a physical downlink control channel (PDCCH: Physical Downlink Control CHannel) corresponding to a DL control signal is arranged. In FIG. 1, as an example, two PDCCHs are arranged in the control signal region. In contrast, a data signal region 14 is a region in which a physical downlink shared channel (PDSCH: Physical Downlink Shared CHannel) corresponding to a DL data signal is arranged. In FIG. 1, as an example, two PDSCHs are arranged in the data signal region.

The PDCCHs (DL control signals) are arranged in the control signal region by a predetermined rule. In addition, the PDSCHs (DL data signals) are each arranged so as to occupy a frequency region (frequency width) within the data signal region. The PDSCHs each occupy a given frequency region within the subframe while not divided into a plurality of pieces in the temporal axis direction within the wireless subframe.

Pieces of DL data (PDSCHs) within the data signal region are associated with the PDCCHs within the control signal region. In FIG. 1, as an example, the two PDCCHs are associated with the respective two pieces of DL data (PDSCHs).

The association of the PDCCH with the DL data (PDSCH) will be described. For the PDCCH, DCI (Data Control Information) that is DL control information is transmitted after coded and modulated. This DCI includes RB allocation (Resource Block Allocation) that is a parameter indicating a frequency region occupied by the PDSCH on the subframe (a wireless resource occupied by the PDSCH). Accordingly, a wireless terminal can recognize a wireless resource occupied by a piece of DL data (PDSCH) addressed to itself by searching within the control signal region and detecting one of the PDCCHs addressed to itself. Therefore, the wireless terminal can extract the piece of DL data (PDSCH) addressed to itself.

Next, search processing within the control signal region, performed by the wireless terminal in order to detect one of the PDCCHs addressed to itself, will be described. CRC (Cyclic Redundancy Check: cyclic redundancy check) is added to the DCI, and this CRC is masked by using RNTI (C-RNTI, SPS-CRNTI, or the like) that is the identifier of a wireless terminal or RNTI (SI-RNTI, P-RNTI, or the like) for notifying common control information. Specifically, by performing logical sum between CRC parity bits of 16 bits and the RNTI or the like of 16 bits, the CRC is masked by the RNTI. In addition, the masking is called scrambling in some cases. If the wireless terminal can decode this masking of the CRC using the RNTI, the wireless terminal determines that one of the PDCCHs is addressed to itself. Specifically, using the RNTI, the wireless terminal performs decoding of masking of the CRC for an entire portion in which one of the PDCCHs may be arranged within the control signal region. In addition, in a case where the decoding of masking of the CRC succeeds, the wireless terminal determines that one of the PDCCHs to which the relevant CRC is added is addressed to itself. On the other hand, in a case where the decoding of masking of the CRC fails, the wireless terminal determines that one of the PDCCHs to which the relevant CRC is added is not addressed to itself. In a case where one of the PDCCHs addressed to itself is detected, it is possible to recognize, based on the value of the RB allocation included in the relevant PDCCH, a wireless resource in which a piece of DL data (PDSCH) is arranged.

Incidentally, in 3GPP, it is decided that the control signal region corresponds to up to three symbols ranging from the frontend. If the control signal region is further increased, it is difficult to maintain compatibility with legacy wireless terminals (wireless terminals and so forth only compatible with up to Release 8). Therefore, it is not realistic to change the limitation of up to the three symbols. However, it is considered that a deficiency of the control signal region is caused by this limitation. Specifically, in a case where, for example, the number of pieces of DL data (PDSCHs) is large and the number of corresponding PDCCHs is large, it is considered that there is a deficiency of the control signal region.

Therefore, in Release 11 of 3GPP, a new DL subframe has been proposed. FIG. 2 illustrates the format of the DL subframe proposed by Release 11.

In the DL subframe in FIG. 2, within the data signal region of the related art, it is possible to set a control signal region other than the control signal region of the related art. The other control signal region is called an enhanced control signal region. In the enhanced control signal region, it is possible to arrange an enhanced-physical downlink control channel (E-PDCCH: Enhanced-Physical Downlink Control CHannel) corresponding to an enhanced DL control signal.

It is possible to use the enhanced control signal region in the same manner as the control signal region of the related art. In addition, in the E-PDCCH, it is possible to transmit the DCI in the same way as in the PDCCH. Therefore, it is possible to associate one of the E-PDCCHs with a piece of DL data (PDSCH) in the same way as the PDCCH. In FIG. 2, as an example, the two E-PDCCHs and one PDCCH are associated with respective three pieces of DL data (PDSCHs). By the introduction of the E-PDCCH, it is possible to increase, as appropriate, a region in which the DL control information (DCI) may be stored while maintaining the compatibility with the legacy wireless terminals. Therefore, it is possible to solve the above-mentioned problem.

CITATION LIST

Patent Literature

PTL1: Japanese National Publication of International Patent Application No. 2012-508483

Non Patent Literature

NPL 1: 3GPP TS36.211 V11.0.0 (2012 September)
NPL 2: 3GPP TS36.212 V11.0.0 (2012 September)
NPL 3: 3GPP TS36.213 V11.0.0 (2012 September)
NPL 4: 3GPP R1-113155 "Motivations and scenarios for ePDCCH" (2011 October)
NPL 5: 3GPP Email discussion[70-17] on R1-123*** "WF on ePDCCH search space" (2012 August)

SUMMARY

According to an aspect of the invention, a wireless communication method includes transmitting, from a base station, a signal in a second control channel that is used for transmitting information indicating a resource of first resource information indicating a resource of a first control channel, and receiving, by a wireless terminal, second resource information that indicates the resource of the first control channel and that is transmitted from the wireless base station before a transmission of the second control channel from the wireless base station to the wireless terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating MIB in an LTE system of the related art.

FIGS. 8A and 8B are diagrams illustrating an example of MIB in the wireless communication system according to the second embodiment.

FIGS. 10A and 10B are diagrams illustrating an example of MIB in a wireless communication system according to a third embodiment.

FIG. 11 is a diagram illustrating an example of arrangement of PBCH (MIB) on a DL subframe in a wireless communication system according to a seventh embodiment.

DESCRIPTION OF EMBODIMENTS

As described above, by the introduction of the enhanced control signal region and the E-PDCCH, it is possible to solve, for example, the problem that there is a deficiency of the control signal region. However, while described in detail later, it is difficult for the wireless terminal to use the enhanced control signal region and the E-PDCCH any time due to various limitations. In other words, in a case where specific conditions are not satisfied, it is difficult for the wireless terminal to use the enhanced control signal region and the E-PDCCH. This reduces the convenience of the enhanced control signal region and the E-PDCCH and becomes a factor for limiting the introduction effect of the enhanced control signal region and the E-PDCCH.

The disclosed technology was made in view of the above, and an object thereof is to provide a wireless communication method, a wireless communication system, a wireless terminal, and a wireless base station which each enable the enhanced control signal and the E-PDCCH to be used in a case where it is difficult for a wireless terminal to utilize the enhanced control signal region and the E-PDCCH using the related art.

Hereinafter, embodiments of a wireless communication method, a wireless communication system, a wireless terminal, and a wireless base station, disclosed in the present application, will be described with reference to drawings. In addition, the wireless communication method, the wireless communication system, the wireless terminal, or the wireless base station, disclosed in the present application, is not limited by the following embodiments.

[Where Problem Is]

Here, where a problem is in the enhanced control signal region and the E-PDCCH of the related art will be described before individual embodiments are described. Note that this problem was newly found out by the inventor as a result of studying in detail the enhanced control signal region and the E-PDCCH of the related art and has not been known in the past.

Figure 1:
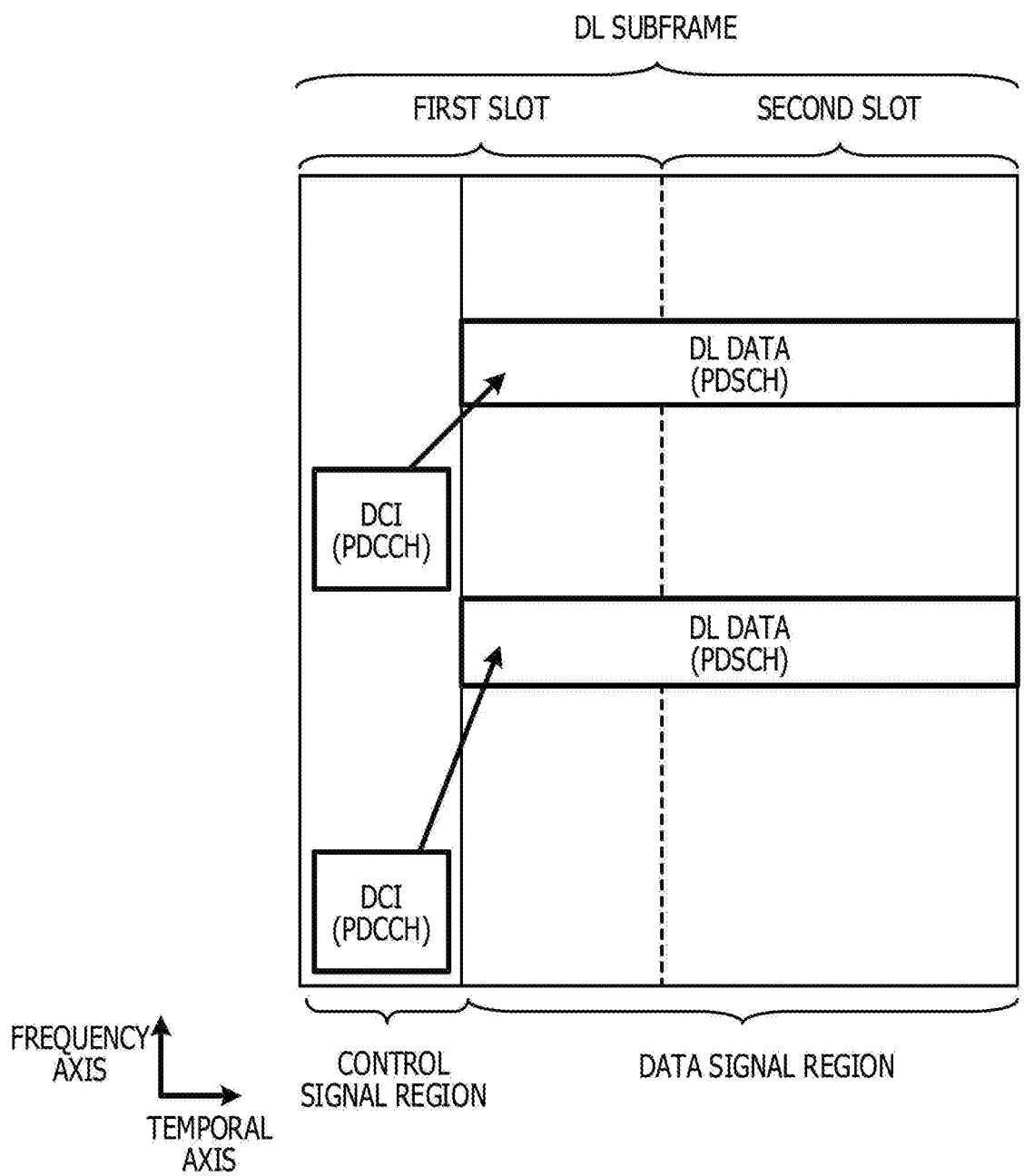
FIG. 1 is a diagram explaining a control signal region and PDCCH.

First, the technical significance of the E-PDCCH will be described. As described above, while having an aspect of being a technique for solving the deficiency of a region (control signal region) in which the PDCCHs are to be arranged, the E-PDCCH has an aspect of being an interference countermeasure for a control signal. As illustrated in FIG. 1, the PDCCHs of the related art are arranged in the control signal region that occupies the entire area of a frequency band to be used. Therefore, in a case where a plurality of wireless base stations adjacent to one another are operated so as to use the same frequency band or frequency bands whose portions overlap with one another, control signals turn out to interfere with one another between the wireless base stations. While more reliability than a data signal is required for transmission and reception of a control signal, the possibility that the interference reduces the quality of a signal, thereby making it difficult to secure reliability, can be considered.

Figure 2:
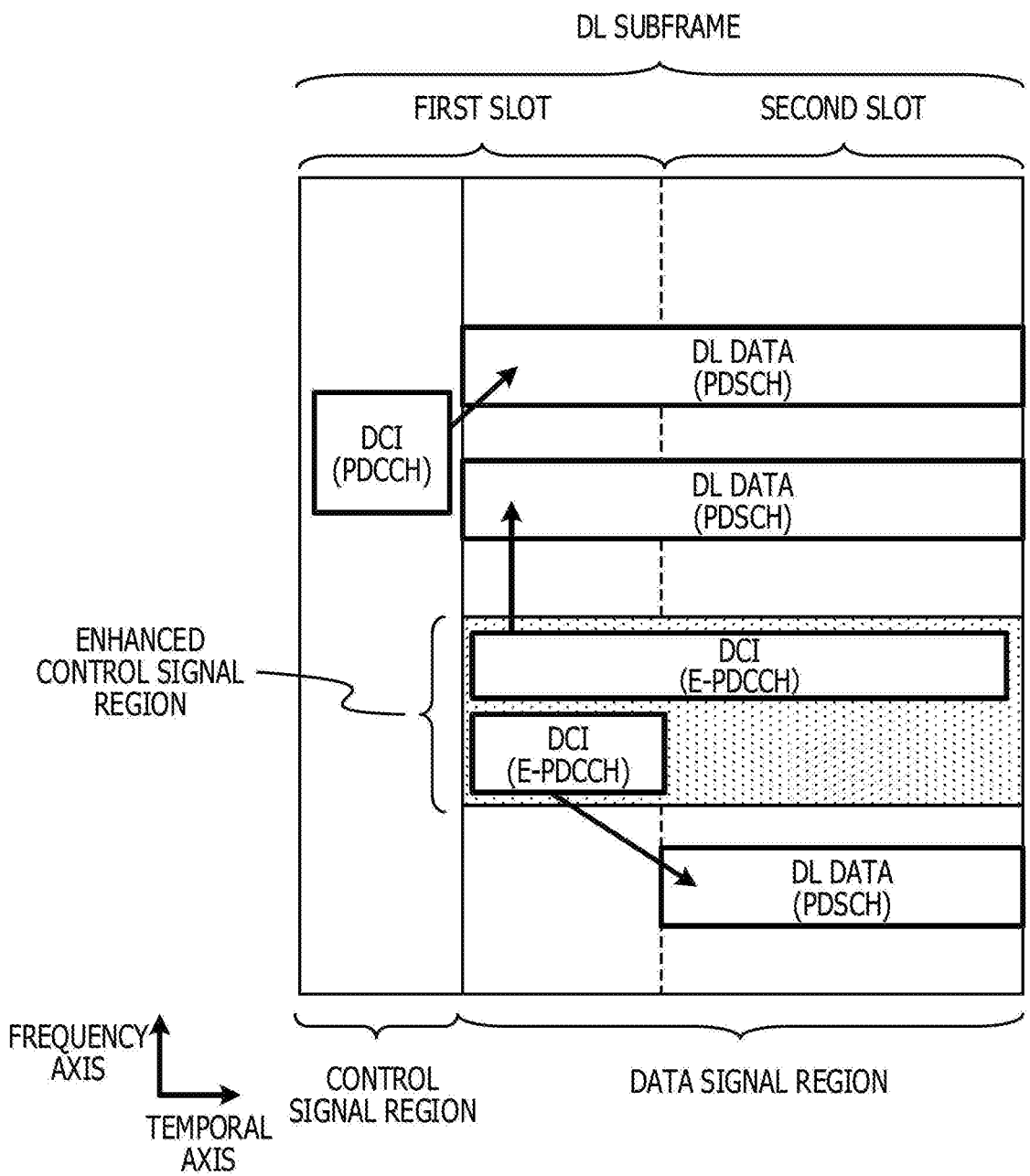
FIG. 2 is a diagram explaining an enhanced control signal region and E-PDCCH.

In contrast, as illustrated in FIG. 2, the newly introduced E-PDCCHs are arranged in an enhanced control signal region that only occupies a portion of a frequency within a frequency band to be used. Therefore, even in a case where the wireless base stations adjacent to one another are operated so as to use the same frequency band or frequency bands whose portions overlap with one another, it is possible to avoid interference between control signals by adjusting frequency bands used for the enhanced control signal regions so as not to overlap with one another between the wireless base stations. While, for example, the frequency bands used for the enhanced control signal regions are preliminarily given notice of between the wireless base stations adjacent to one another, thereby realizing such adjustment, such adjustment may be realized using another method. In any case, using the E-PDCCHs, it is possible to avoid the occurrence of interference in the control signal. Therefore, it becomes possible to reliably transmit and receive the control signal.

In this manner, unlike in the case of the PDCCH, the E-PDCCH can suppress interference in the control signal. Therefore, it is conceivable that the E-PDCCH is used as an interference countermeasure for the control signal, in place of the PDCCH. In other words, as the usage scenario of the E-PDCCH, in addition to a scenario in which the E-PDCCH is used in addition to the PDCCH, it is conceivable that a scenario in which the E-PDCCH is used instead of the PDCCH may be assumed.

Next, in preparation for discussing a problem in the E-PDCCH of the related art, the operation mode of a wireless terminal, specified in the LTE system (Release 8 of 3GPP or later), will be described. While a wireless protocol in the LTE system is configured by a number of layers (layers), an idle mode (RRC_IDLE state) and a connected mode (RRC_CONNECTED state) are specified as the operation modes (RRC states) of the wireless terminal in an RRC (Radio Resource Control) layer corresponding to an L3 (Layer 3). In the LTE system, the currently active wireless terminal inevitably corresponds to one of the idle mode and the connected mode.

The idle mode is an operation mode corresponding to a standby state of the wireless terminal. As long as data to be transmitted or received is not generated, the wireless terminal in the idle mode does not perform communication other than periodically transmitting or receiving a signal where are necessarily for administrative purposes. From this, the wireless terminal in the idle mode can reduce power consumption. In addition, in a case where data to be transmitted or received is generated, the wireless terminal in the idle mode performs random access or the like, thereby making a transition to the connected mode. On the other hand, the connected mode is a state in which the wireless terminal is currently connected to a wireless base station, and the connected mode corresponds to a state in which a connection is held between the wireless terminal and the wireless base station and the wireless terminal and the wireless base station can transmit and receive data signals. The connected mode may be understood to correspond to a non-standby state of the wireless terminal. In such a case where transmission or reception of no data is performed during a given period of time, the wireless terminal in the connected mode releases a connection with the wireless base station, thereby making a transition to the idle mode.

Here, in Release 11 of 3GPP, without a change from Release 8, the idle mode and the connected mode are specified as the operation modes of the wireless terminal in the RRC layer. In addition, as described above, the E-PDCCH is newly introduced in Release 11. However, in Release 11, it is not specified that the wireless terminal receives the E-PDCCH in the idle mode. Accordingly, in Release 11, it is difficult for the wireless terminal to receive (use) the E-PDCCH in the idle mode. The inventor considers that this point is a problem in the E-PDCCH of the related art.

In regard to this point, the specification of Release 11 of 3GPP will be more specifically described. In the idle mode, it is specified that the wireless terminal can receive system information (broadcast information) broadcasted from the wireless base station and paging (paging). Two types of system information are a MIB (Master Information Block) and an SIB (System Information Block). Since the MIB is mapped to a PBCH (Physical Broadcast CHannel), whose wireless resource is predefined, and is transmitted, the wireless terminal can receive the MIB without the interposition of a control channel. On the other hand, since the SIB is mapped to the PDSCH, it is desirable for the wireless terminal to receive the PDCCH in order to receive the SIB, as described above. In addition, since the paging is mapped to the PDSCH and transmitted, it is desirable for the wireless terminal to receive the PDCCH in order to receive the paging. Here, as described above, usual user data are addressed to individual wireless terminals. Therefore, the CRC of the DCI (PDCCH) associated with each user data (PDSCH) is masked by using the C-RNTI serving that is an identifier unique to the wireless terminal. However, since the SIB is information common to all wireless terminals under the control of a wireless base station (cell), the CRC of the DCI (PDCCH) is masked by using a common identifier called the SI-RNTI. In the same manner, as for the paging, the CRC of the DCI (PDCCH) is masked by using a common identifier called the P-RNTI.

Here, in Release 11 of 3GPP, it is specified that, in a case where the CRC is masked by masking using the SI-RNTI or the P-RNTI, reception is performed by the PDCCH. On the other hand, it is specified that, in a case where the CRC is masked by using the C-RNTI, reception is performed by the PDCCH or the E-PDCCH. From these specifications, it is conceivable that, in a case where the CRC is masked by using the SI-RNTI or the P-RNTI, reception by the E-PDCCH is not assumed. Accordingly, it can be concluded that, in Release 11 of 3GPP, it is extremely difficult for the wireless terminal in the idle mode to receive the E-PDCCH.

From the above, in Release 11 of 3GPP, it is extremely difficult for the wireless terminal in the idle mode to receive the E-PDCCH. In other words, it is possible for the wireless terminal to receive the E-PDCCH only in the connected mode. Accordingly, it is conceivable that, in order to receive (use) the E-PDCCH, the wireless terminal in the idle mode has to be temporarily transited to the connected mode. The inventor considers that this limitation reduces the convenience of the enhanced control signal region and the E-PDCCH and become a factor for limiting the introduction effect of the enhanced control signal region and the E-PDCCH.

Figure 3:
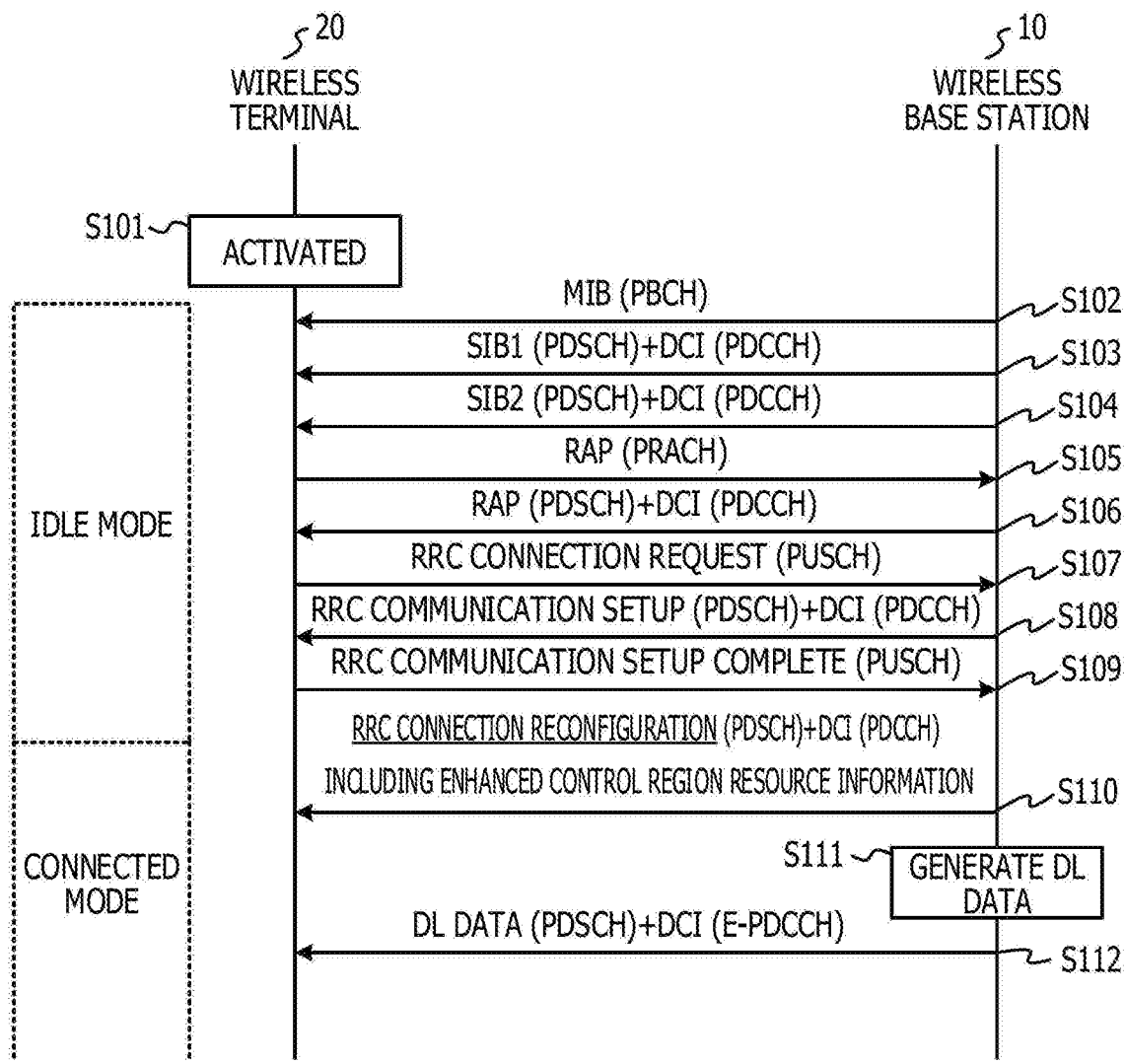
FIG. 3 is a diagram illustrating an example of a processing sequence used by a wireless terminal in an idle mode to receive the E-PDCCH.

This limitation will be described based on FIG. 3. FIG. 3 is a diagram illustrating a processing sequence from when a wireless terminal 20 currently halted (powered off) is activated to when the wireless terminal 20 receives (uses) the E-PDCCH. When being activated, the currently halted wireless terminal 20 is transit to the idle mode first. Therefore, FIG. 3 corresponds to a typical example of the processing sequence to when the wireless terminal 20 in the idle mode receives the E-PDCCH. As an assumption in FIG. 3, it is assumed that the wireless terminal 20 is located within a cell formed by a wireless base station 10 and is currently halted (in a power-off state).

In addition, arrows in processing sequence diagrams in and after FIG. 3 each indicate a signal transmitted and received between the wireless terminal 20 and the wireless base station 10. Arrows headed from the wireless base station 10 to the wireless terminal 20 each correspond to a DL signal (DL subframe), and arrows headed from the wireless terminal 20 to the wireless base station 10 each correspond to an UL signal (UL subframe). In addition, character strings attached to individual arrows each indicate information (described on the outside of parentheses) included in a signal (subframe) and a physical channel (described on the inside of parentheses) that is a region on the subframe used for arranging therein the relevant information.

In S101 in FIG. 3, the wireless terminal 20 is activated. The activation of the wireless terminal 20 is performed by holding down, for example, a button for activation provided in the wireless terminal 20. First, the activated wireless terminal 20 operates in the idle mode first.

When the wireless terminal 20 is activated, the wireless terminal 20 performs so-called band search and cell search, thereby detecting a synchronization signal transmitted from the wireless base station 10. In addition, based on the detected synchronization signal, the wireless terminal 20 identifies a center frequency used by the wireless base station 10 and performs synchronization of a downlink. In addition, based on the pattern of the synchronization signal, the wireless terminal 20 obtains a cell ID that is the identifier of a cell formed by the wireless base station 10. The synchronization signal is mapped to a synchronization channel on the DL subframe, and two types of synchronization channel are a P-SCH (Primary Synchronization CHannel) and an S-SCH (Secondary Synchronization CHannel). Here, the details thereof will be omitted.

The wireless terminal 20 that acquires the cell ID becomes able to demodulate the DL signal transmitted from the wireless base station 10. In and after S102, while not specified in particular, the wireless terminal 20 demodulates the DL signal and extracts various kinds of information from the DL signal, in the following way. Based on the cell ID acquired in S101, the wireless terminal 20 detects a reference signal arranged in the DL signal (DL subframe). In addition, based on the reference signal, the wireless terminal 20 estimates a channel characteristic. Based on the estimated channel characteristic, the wireless terminal 20 can demodulate the DL signal and obtain various kinds of information included in the DL signal.

Returning to the description of FIG. 3, in S102, the wireless terminal 20 receives the MIB (Master Information Block) from the wireless base station 10. The MIB is one type of system information (broadcast information) and is transmitted and received by a physical broadcast channel (PBCH: Physical Broadcast CHannel). The PBCH is transmitted at a predetermined timing (with a period of 40 subframes: can be repeatedly transmitted every 10 subframes) and arranged in a predetermined frequency band in the vicinity of the center frequency (identified in S101) in the DL signal. Therefore, the wireless terminal 20 can receive the MIB without receiving a control signal indicating a wireless resource in which the MIB (PBCH) is arranged.

Figure 4:
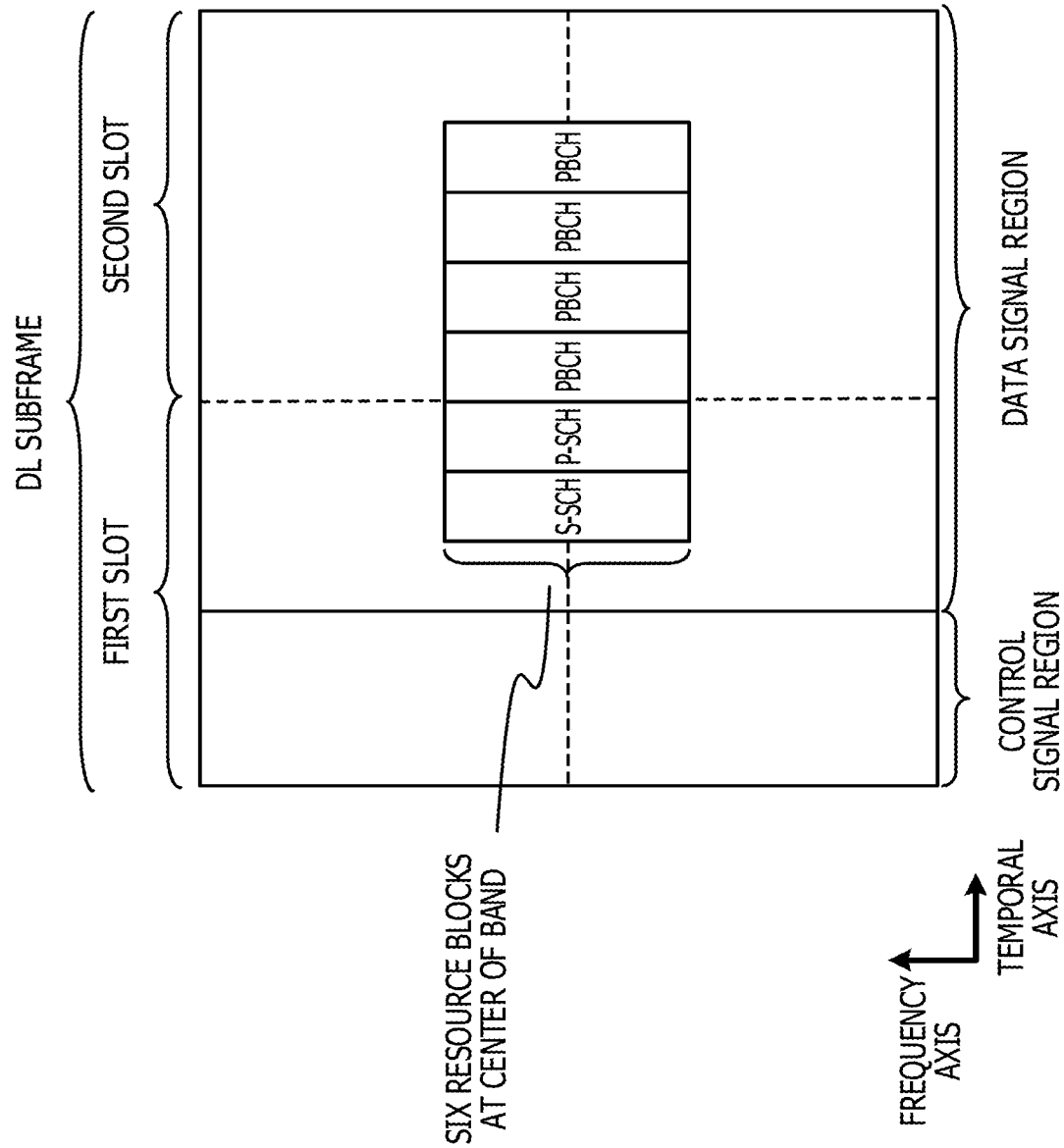
FIG. 4 is a diagram illustrating arrangement of PBCH (MIB) in a DL subframe.

FIG. 4 illustrates the transmission region of the MIB (PBCH) in the DL subframe. The PBCH is arranged only in an initial DL subframe of a DL frame (10 DL subframes). FIG. 4 illustrates the initial DL subframe of the DL frame. As illustrated in FIG. 4, in a second slot of the initial DL subframe in the DL frame, the PBCH is arranged in the band with six resource blocks located anterior and posterior to the center frequency. Since the wireless resource of the PBCH is preliminarily defined in this manner, the wireless terminal 20 can receive the MIB without receiving the control signal indicating the wireless resource in which the MIB (PBCH) is arranged. The MIB includes minimum information used for receiving other system information (broadcast information).

In addition, as described above, the MIB (PBCH) can be repeatedly transmitted every 10 subframes four times. While reliability is requested for the transmission and reception of the MIB, the MIB is transmitted in this manner, thereby securing the reliability of transmission and reception. The MIB includes information indicating, for example, a frequency bandwidth used by the wireless base station 10.

Next, in S103, the wireless terminal 20 receives an SIB1 from the wireless base station 10. The SIB1 is one type of system information (broadcast information), and while a timing when the SIB1 is transmitted is defined in units of subframes (with a period of 80 subframes), the SIB1 is dynamically arranged in the PDSCH, unlike in the case of the MIB. Therefore, after receiving, in the PDCCH, the DCI for receiving the SIB1, the wireless terminal 20 receives the SIB1 in the PDSCH. In addition, while not clearly illustrated in the drawing, in order to receive the PDCCH, a PCFICH (Physical Control Format Indicator CHannel) that serves as a physical channel including information indicating a control signal region is received.

Processing on a wireless terminal 20 side in S103 will be described in more detail. Based on the center frequency acquired in S101 and the frequency bandwidth acquired in S102, the wireless terminal 20 can recognize a frequency band used by the wireless base station 10. In addition, since the wireless terminal 20 completes the synchronization of the DL signal in S101, the wireless terminal 20 can read each subframe from the DL signal. Upon extracting the subframe, the wireless terminal 20 receives the PCFICH arranged in a predetermined wireless resource (a predetermined location of the initial resource block) in the subframe. The PCFICH includes information indicating how many symbols from the frontend of the subframe in the temporal axis direction the control signal region corresponds to (one of cases of 1 to 3 symbols). From this, the wireless terminal 20 can extract the control signal region from the relevant subframe.

In S103, continuously the wireless terminal 20 searches the control signal region in order to detect the DCI (PDCCH) associated with the SIB1 (PDSCH). As described above, this search is performed by the CRC assigned to the DCI. In addition, as described above, the masking of the CRC of the DCI (PDCCH) added to the SIB1 is decoded using not the C-RNTI in the same manner as in the usual user data but the SI-RNTI serving as the common identifier.

From above, the wireless terminal 20 can obtain the DCI (PDCCH) associated with the SIB1 (PDSCH). Based on RB allocation included in this DCI, the wireless terminal 20 recognizes a wireless resource occupied by the SIB1 (PDSCH). From this, the wireless terminal 20 can obtain the SIB1. The SIB1 includes such information that indicates a timing (subframe) when an SIB2 serving as the other system information (broadcast information) or the like is transmitted.

In S104, the wireless terminal 20 receives the SIB2 from the wireless base station 10. The SIB2 is one type of system information (broadcast information), and a timing (subframe) when the SIB2 is transmitted is indicated by the SIB1. In the same way as the SIB1, the SIB2 is mapped to the PDSCH. Therefore, in S104, the wireless terminal 20 receives the DCI (PDCCH) associated with the SIB2 (PDSCH) first, and receives the SIB2 (PDSCH), based on the received DCI (PDCCH).

Since the reception of the SIB2 in S104 can be performed in the same way as the reception of the SIB1 in S103, the detailed description thereof will be omitted. While including various kinds of information, the SIB2 includes, for example, information indicating an uplink usable frequency (a center frequency and a frequency band).

In addition, while not clearly illustrated in FIG. 3, between S104 and S105, the wireless terminal 20 may arbitrarily receive a SIB3 or the like (up to an SIB13 are specified in Release 11 of 3GPP) as appropriate. The SIB3 or later is one type of system information (broadcast information), and a timing (subframe) when the SIB3 or the like is received is indicated by the SIB1. In the same way as the SIB1 or the SIB2, the SIB3 or the like is mapped to the PDSCH. While the SIB3 or the like includes various kinds of information, the detail thereof will be omitted here.

Next, in S105, the wireless terminal 20 transmits a random access preamble (RAP: Random Access Preamble) to the wireless base station 10. The wireless terminal 20 randomly selects one of 64 types of random access preamble (pattern signals) allocated to the wireless base station 10, maps the random access preamble (pattern signal) to a PRACH (Physical Random Access CHannel) arranged in a predetermined region of an UL subframe, and transmits the random access preamble (pattern signal) to the wireless base station 10.

In S106, in response to the random access preamble received in S105, the wireless base station 10 transmits a random access response (RAR: Random Access Response) to the wireless terminal 20. The random access response is mapped to the PDSCH in the DL subframe. Therefore, in S106, the wireless terminal 20 receives the DCI (PDCCH) associated with the random access response (PDSCH) first, and receives the random access response (PDSCH), based on the received DCI (PDCCH).

While the reception of the random access response in S106 can be performed in substantially the same way as the reception of the SIB1 in S103, the reception of the random access response in S106 is different only in that the R-RNTI is used instead of the SI-RNTI. Here, the detailed description thereof will be omitted. While including several kinds of information, the random access response includes, for example, Temporary C-RNTI that is a temporary identifier of the wireless terminal 20. In addition, the random access response includes necessary information used by the wireless terminal 20 for the synchronization of an uplink. Based on the random access response, the wireless terminal 20 can synchronize the uplink with the wireless base station 10.

In S107, in response to the random access response received in S106, the wireless terminal 20 transmits an RRC Connection Request message to the wireless base station 10. The RRC Connection Request message is a message used for causing the wireless base station 10 to allocate the C-RNTI to the wireless terminal 20. The RRC Connection Request message is a signal of an L3 (Layer 3) and is mapped to a physical uplink shared channel (PUSCH: Physical Uplink Shared CHannel) in the UL subframe. In general, in a case of intending to transmit UL data including an L3 signal or the like using the PUSCH, the wireless terminal 20 transmits (not illustrated) a scheduling request to the wireless base station 10 using a physical uplink control channel (PUCCH: Physical Uplink Control CHannel). Furthermore, the wireless base station 10 transmits (not illustrated) an UL grant for a BSR (Buffer Status Report) to the wireless terminal 20 using the PDSCH, the wireless terminal 20 transmits (not illustrated), based on the relevant UL grant, the BSR to the wireless base station 10 using the PDSCH, and the wireless base station 10 transmits (not illustrated) an UL grant for UL data to the wireless terminal 20 using the PDSCH. Finally, based on the relevant UL grant, the wireless terminal 20 transmits the UL data to the wireless base station 10 using the PUSCH. Here, the detail thereof will be omitted.

In S108, in response to the RRC Connection Request message received in S107, the wireless base station 10 transmits an RRC Connection Setup message to the wireless terminal 20. The RRC Connection Setup message is mapped to the PDSCH in the DL subframe. Therefore, in S108, the wireless terminal 20 receives the DCI (PDCCH) associated with the RRC Connection Setup message (PDSCH) first, and receives the RRC Connection Setup message (PDSCH), based on the received DCI (PDCCH).

While the reception of the RRC Connection Setup message in S108 can be performed in substantially the same way as the reception of the SIB1 in S103, the reception of the RRC Connection Setup message in S108 is different only in that the Temporary C-RNTI (acquired by the wireless terminal 20 in S106) is used instead of the SI-RNTI. Here, the detailed description thereof will be omitted. While including several kinds of information, the RRC Connection Setup message includes, for example, information of a wireless resource individually used by the wireless terminal 20. In a case where the wireless terminal 20 possesses no C-RNTI (in a case of, for example, an initial access for making a transition from the idle mode to the access mode), the Temporary C-RNTI is promoted to the C-RNTI.

In S109, in response to the RRC Connection Setup message received in S108, the wireless terminal 20 transmits an RRC Connection Setup Complete message to the wireless base station 10. The RRC Connection Request message is a signal of the L3 and mapped to the PUSCH in the UL subframe. The transmission of the RRC Connection Setup Complete message in S109 can be performed in the same way as the transmission of the RRC Connection Request message in S107.

By transmitting the RRC Connection Setup Complete message in S109, the wireless terminal 20 makes a transition from the idle mode to the connected mode. Since, from this point forward, operating in the connected mode, the wireless terminal 20 becomes able to receive the E-PDCCH as described above. In FIG. 3, due to a reason such as intention of avoiding interference in the control signal, the wireless base station 10 intends to cause the wireless terminal 20 to use the E-PDCCH. At this time, for the wireless terminal 20, the wireless base station 10 has to indicate an enhanced control signal region to which the E-PDCCH is to be mapped. Therefore, in FIG. 3, as an example, an RRC Connection Reconfiguration message including information indicating the enhanced control signal region is used. In addition, a signal used by the wireless base station 10 to indicate the enhanced control signal region for the wireless terminal 20 is allowed not to be the RRC Connection Reconfiguration message, may be another L3 signal (RRC signaling), and may be an L2 signal or an L1 signal.

Returning to the description of FIG. 3, in S110, the wireless base station 10 transmits, to the wireless terminal 20, the RRC Connection Reconfiguration message including information that indicates the enhanced control signal region. In S110, by receiving, from the wireless base station 10, the RRC Connection Reconfiguration message including information that indicates the enhanced control signal region (for the sake of convenience, called enhanced control resource information in some cases), the wireless terminal 20 can recognize the enhanced control signal region.

The RRC Connection Reconfiguration message is mapped to the PDSCH in the DL subframe. Therefore, in S110, the wireless terminal 20 receives the DCI (PDCCH) associated with the RRC Connection Reconfiguration message (PDSCH) first, and receives the RRC Connection Reconfiguration message (PDSCH), based on the received DCI (PDCCH). While the reception of the RRC Connection Reconfiguration message in S110 can be performed in substantially the same way as the reception of the RRC Connection Setup message in S108, the reception of the RRC Connection Reconfiguration message in S110 is different only in that the RNTI (acquired by the wireless terminal 20 in S108) is used instead of the Temporary C-RNTI.

Next, in S111, it is assumed that, in the wireless base station 10, DL data addressed to the wireless terminal 20 is generated. For example, in a case where there is an incoming call addressed to the wireless terminal 20 or when application data such as an electronic mail is transferred to the wireless terminal 20, the DL data addressed to the wireless terminal 20 is generated in the wireless base station 10.

In S112, the wireless base station 10 transmits, to the wireless terminal 20, the DL data generated in S111. Here, the wireless base station 10 maps the DL data to the PDSCH on the DL subframe and maps the DCI that is information indicating the wireless resource of the relevant PDSCH, to the E-PDCCH on the DL subframe. The wireless terminal 20 receives the DL subframe, and reads the enhanced control signal region on the relevant DL subframe, based on the RRC Connection Reconfiguration message received in S110. In addition, based on the C-RNTI (acquired by the wireless terminal 20 in S108), the wireless terminal 20 searches for the DCI (E-PDCCH) addressed to itself and arranged in the enhanced control signal region. Finally, based on the searched DCI (E-PDCCH), the wireless terminal 20 can identify the wireless resource of the PDSCH and obtain the DL data mapped to the relevant PDSCH. From this, the processing sequence illustrated in FIG. 3 is completed.

As described based on FIG. 3 as above, it is desirable that the wireless terminal 20 in the idle mode is temporarily transited to the connected mode in order to use the E-PDCCH. However, the inventor considers that several problems exist in the processing sequence in FIG. 3 as describe below.

As the first problem, there may be considered the possibility that, owing to interference in the PDCCH, it is difficult to complete the processing sequence in FIG. 3 and as a result, it is difficult for the wireless terminal 20 to use the E-PDCCH. As described above, since the PDCCHs interfere with each other between cells adjacent to each other, it is difficult to ignore the possibility that the PDCCH fails to be received by the wireless terminal 20. However, in the sequence in FIG. 3, it is desirable that the wireless terminal 20 receives the PDCCH several times so that the wireless terminal 20 receives the E-PDCCH. If the occurrence of interference is temporary, the reception may eventually succeed. However, in a case where large interference lasts long, the reception of the PDCCH turn out to repeatedly fail. As a result, it may be supposed that it is difficult to complete the processing sequence in FIG. 3.

As the second problem, it is difficult to realize a utilization scenario in which the E-PDCCH is used without the PDCCH used. As described above, compared with the PDCCH, it is possible for the E-PDCCH to suppress interference. Therefore, as the usage scenario of the E-PDCCH, in addition to a scenario in which the E-PDCCH is added to the PDCCH and used, a scenario in which the E-PDCCH is used in place of the PDCCH is conceivable. However, according to the processing sequence in FIG. 3, it is desirable that the wireless base station 10 transmits the PDCCH in order to cause the wireless terminal 20 to use the E-PDCCH. Therefore, in the processing sequence in FIG. 3, it becomes difficult to realize a utilization scenario in which the E-PDCCH is used without the PDCCH used.

As the third problem, compared with the PDCCH, a delay with which the wireless terminal 20 in the idle mode receives the E-PDCCH is large. While illustrated in the processing sequence in FIG. 3, it is possible for the wireless terminal 20 to receive the PDCCH if receiving the MIB (and the PCFICH not illustrated). On the other hand, in order for the wireless terminal 20 to receive the E-PDCCH, it is desirable to follow many procedures after that, as illustrated in FIG. 3. Accordingly, in a case where, based on the E-PDCCH, the wireless terminal 20 in the idle mode receives data, it is conceivable that a delay occurs in the reception of data, compared with a case where the wireless terminal 20 in the idle mode receives data, based on the PDCCH.

Summarizing the above, while it is desirable that, in order to use the E-PDCCH, the wireless terminal 20 in the idle mode is transit to the connected mode once, a plurality of problems exist in a processing procedure for realizing this. As described above, these problems were newly found out by the inventor as a result of studying in detail the related art and have not been known in the past. The inventor considers that these problems reduce the convenience of the enhanced control signal region and the E-PDCCH and limit the introduction effect of the enhanced control signal region and the E-PDCCH. Hereinafter, individual embodiments of the present application for solving these problems will be described in order.

First Embodiment

Plainly speaking, in a wireless communication system of a first embodiment, the wireless terminal 20 receives information indicating the resource of the E-PDCCH, in a signal transmitted by the wireless base station 10 before the PDCCH. In other words, the wireless communication system of the first embodiment is a wireless communication method in a wireless communication system in which the wireless base station 10 transmits, to the wireless terminal 20, a second control channel (for example, the PDCCH) that includes information indicating the resource of first resource information indicating the resource of a first control channel (for example, the E-PDCCH), wherein the wireless terminal 20 receives second resource information that indicates the resource of the first control channel and which is transmitted from the wireless base station 10 before the second control channel.

Hereinafter, the wireless communication system of the first embodiment will be specifically described based on drawings. In the wireless communication system of the first embodiment, the first control channel and the second control channel serving as two types of control channel are used. Based on FIG. 5, a processing sequence when the wireless terminal 20 in the wireless communication system of the first embodiment receives (uses) the first control channel will be described.

First, S203 in FIG. 5 will be described. In S203, the wireless terminal 20 receives the information that indicates the resource of the first resource information indicating the resource of the first control channel, from the wireless base station 10 through the second control channel.

Next, S201 in FIG. 5 will be described. In S201, the wireless base station 10 transmits, to the wireless terminal 20, the second resource information that indicates the resource of the first control channel. The second resource information is transmitted and received through a channel other than the first control channel and the second control channel.

Figure 5:
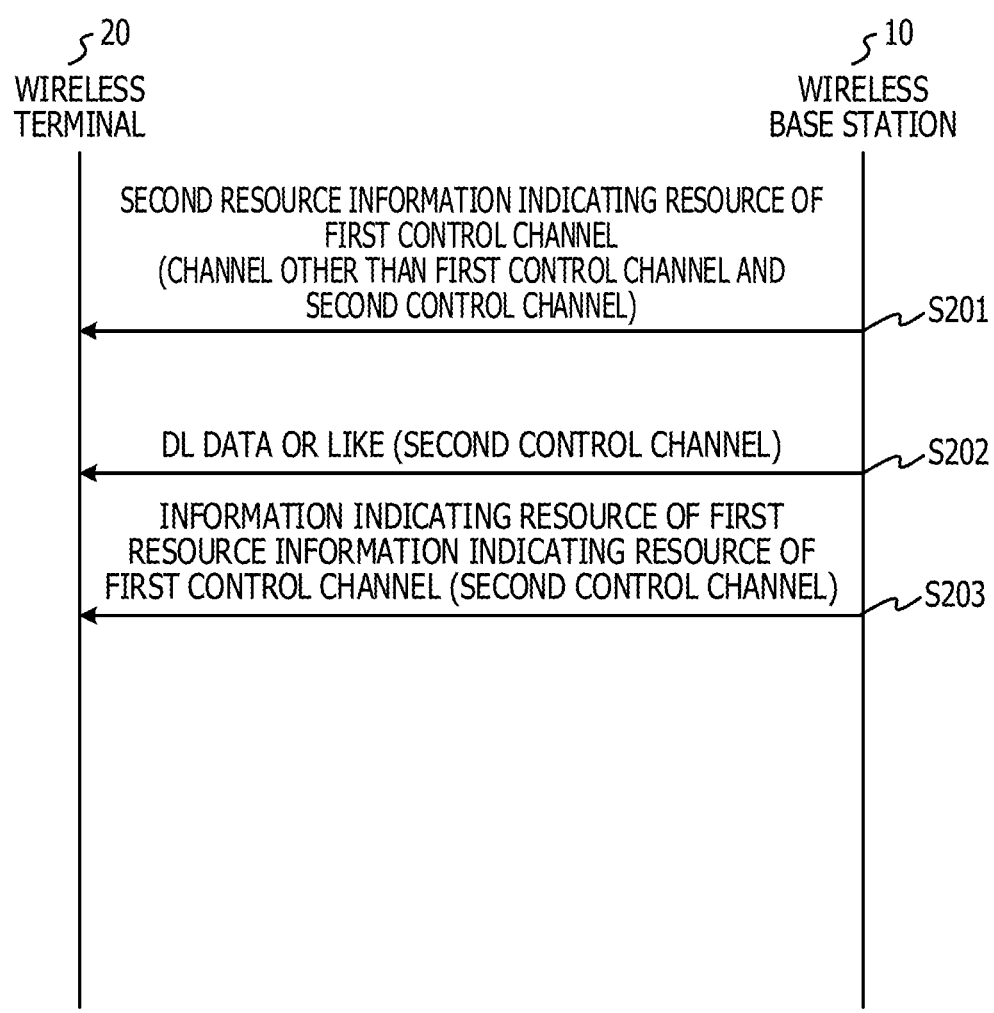
FIG. 5 is a diagram illustrating an example of a processing sequence for receiving the E-PDCCH in a wireless communication system according to a first embodiment.

In S202 in FIG. 5, the wireless terminal 20 receives the second control channel. In this S202, information transmitted and received through the second control channel can be any information. In addition, in FIG. 5, S202 is optional and is not an indispensable procedure. To the contrary, while the wireless terminal 20 receives the second control channel only once (S202) between S201 and S203 in FIG. 5, the wireless terminal 20 may receive the second control channel more than once.

In any case, as described based on FIG. 5, the wireless communication system of the first embodiment is a wireless communication method in a wireless communication system in which the wireless base station 10 transmits, to the wireless terminal 20, the second control channel that includes information indicating the resource of the first resource information indicating the resource of the first control channel, and the wireless terminal 20 receives the second resource information that indicates the resource of the first control channel and which is transmitted from the wireless base station 10 before the second control channel.

According to the wireless communication system of the first embodiment, it becomes possible to receive the first control channel while not receiving the second control channel.

Second Embodiment

A second embodiment corresponds to an example of the first embodiment and therewithin, the first embodiment is described more specifically and in more detail in conformity to a real LTE system (Release 11 of 3GPP).

Hereinafter, the wireless communication system of the second embodiment will be specifically described based on drawings. First, based on FIG. 6, a processing sequence when the wireless terminal 20 in the wireless communication system of the second embodiment uses the E-PDCCH will be described.

Figure 6:
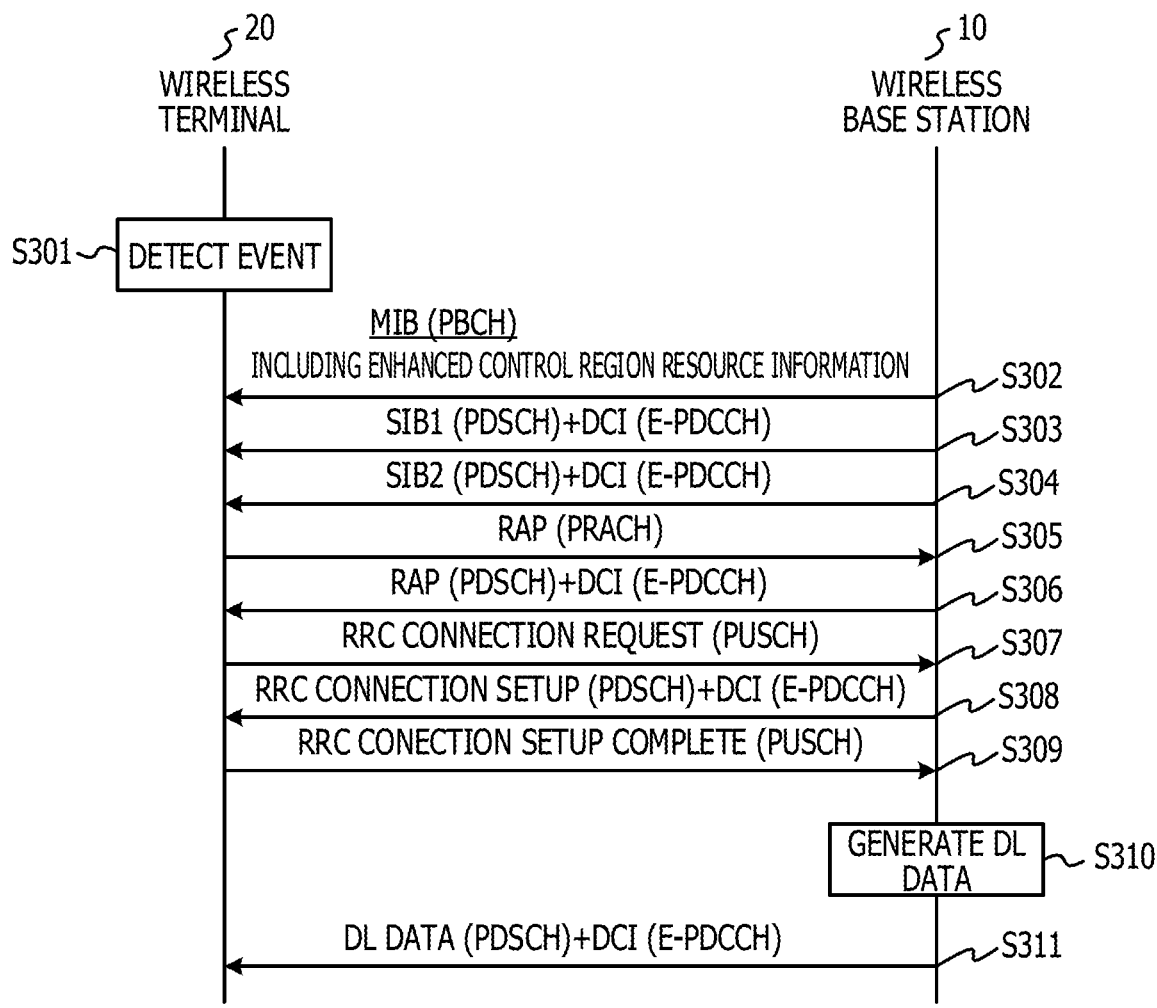
FIG. 6 is a diagram illustrating an example of a processing sequence for receiving the E-PDCCH in a wireless communication system according to a second embodiment.

As an assumption in FIG. 6, it is assumed that the wireless terminal 20 is located within a cell formed by the wireless base station 10. Here, note that, as the assumption in FIG. 6, the wireless terminal 20 does not have to be currently halted as in FIG. 3. At the time of start of the processing sequence in FIG. 6, the wireless terminal 20 may be currently activated and may be in any one of the idle mode and the connected mode. In other words, note that a target to which the present embodiment is applied is not limited to the wireless terminal 20 in the idle mode and may include the wireless terminal 20 in the connected mode.

In S301 in FIG. 6, the wireless terminal 20 detects an event serving as a trigger to collect system information (broadcast information). In the LTE system, it is specified that the wireless terminal 20 collects the system information in a case of detecting a predetermined event. This event includes, for example, switch on to (activation of) the wireless terminal 20, cell reselection, handover, an entry from another RAT (Radio Access Technology) such as a wireless LAN (Local Area Network), restoration from disconnection, reception of a notification that the system information has been changed, reception of information such as an earthquake or a tsunami, and expiration of the term of validity of the system information. The wireless terminal 20 monitors the occurrences of these events on a steady basis and proceeds to S302 in a case of detecting an event. In a case of detecting no event, the wireless terminal 20 continues monitoring an event.

In S302 in FIG. 6, the wireless base station 10 transmits the MIB (Master Information Block) to the wireless terminal 20. In response to this, in S302, the wireless terminal 20 receives the MIB from the wireless base station 10. As described above, the MIB is one type of system information (broadcast information) and transmitted and received using the PBCH. The PBCH is transmitted at a predetermined timing (with a period of 40 subframes: can be repeatedly transmitted every 10 subframes) and arranged in a predetermined frequency band in the vicinity of the center frequency in the DL signal. Therefore, the wireless terminal 20 can receive the MIB without receiving the control signal indicating a wireless resource in which the MIB (PBCH) is arranged. The MIB includes information indicating, for example, a frequency bandwidth used by the wireless base station 10.

Here, the MIB in the second embodiment is different from the MIB of the related art and includes information indicating a wireless resource occupied by the enhanced control signal region (for the sake of convenience, called enhanced control signal resource information in some cases). Since the enhanced control signal region corresponds to a region for arranging therein the E-PDCCH, the enhanced control signal resource information may be understood as information indicating the wireless resource of the E-PDCCH.

Here, for comparison, the MIB of the related art is illustrated in FIG. 7. The MIB illustrated in FIG. 7 includes no information indicating a wireless resource occupied by the enhanced control signal region.

The MIB in the second embodiment will be described based on FIGS. 8A and 8B. FIG. 8A is a diagram illustrating an example of the form of the MIB in the second embodiment. The MIB in the second embodiment illustrated in FIG. 8A includes an E-PDCCH-usage and an E-PDCCH-space serving as parameters. Here, the E-PDCCH-usage and the E-PDCCH-space correspond to the above-mentioned enhanced control signal resource information.

The E-PDCCH-usage is a parameter that indicates whether or not to use (arrange) the enhanced control signal region (E-PDCCH) in the DL subframe. The E-PDCCH-usage can be defined as, for example, information of 1 bit where the value of the E-PDCCH-usage becomes "1" in a case of using the enhanced control signal region and the value thereof becomes "0" in a case of not using the enhanced control signal region.

In addition, the E-PDCCH-space is a parameter indicating a wireless resource indicated by the enhanced control signal region in a downlink subframe. The E-PDCCH-space can be defined as arbitrary information for indicating a wireless resource occupied by the enhanced control signal region. The E-PDCCH-space may be defined as, for example, information for indicating the frequency component of the enhanced control signal region. More specifically, the E-PDCCH-space may be defined as information for indicating the location of the enhanced control signal region in a frequency direction, in units of resource blocks (PRB: Physical Resource Blocks).

FIG. 8B is a diagram illustrating an example of the definition of the E-PDCCH-space in the MIB illustrated in FIG. 8A. In the LTE system, 6 kinds of system bandwidths such as 1.4 MHz, 3 MHz, 5 MHz, 10 MHz, 15 MHz, and 20 MHz are prepared. In addition, it is specified that, in a case where the system bandwidth is, for example, 1.4 MHz, the number of resource blocks in the frequency direction becomes 6. Here, for the 6 resource blocks, the identifiers thereof may be defined as 1 to 6 in order of increasing frequency component. In the same way as in a case where the system bandwidth is 1.4 MHz, in cases where the system bandwidths are 3 MHz, 5 MHz, 10 MHz, 15 MHz, and 20 MHz, the numbers of resource blocks in the frequency direction are 15, 25, 50, 75, and 100, respectively. In addition, in the same way as in a case where the system bandwidth is 1.4 MHz, in cases where the system bandwidths are 3 MHz, 5 MHz, 10 MHz, 15 MHz, and 20 MHz, identifiers can be assigned to the respective resource blocks.

In FIG. 8B, in a case where the E-PDCCH-space illustrated in FIG. 8A is information of three bits, the definition of the relevant E-PDCCH-space is illustrated as an example. The E-PDCCH-space at this time can express eight kinds of values of 000 to 111. Using the eight kinds of values, the E-PDCCH-space can indicate eight kinds of locations of the enhanced control signal region in the frequency direction in units of resource blocks.

In FIG. 8B, in a case where the system bandwidth is 1.4 MHz (corresponding to 6 resource blocks), the E-PDCCH-space can be defined so as to indicate the respective identifiers, 1 to 6, of the resource blocks whose total number is 6, using the 6 kinds of values of 000 to 101. In addition, values, 110 and 111, not used here, may be defined as N/A (Not Applicable). On the other hand, in FIG. 8B, in a case where the system bandwidth is 5 MHz (corresponding to 25 resource blocks), the E-PDCCH-space can be defined so as to indicate the respective identifiers of the 8 resource blocks of 1, 5, 8, 11, 14, 17, 20, and 23 among total resource blocks of 25, using the 8 kinds of values of 000 to 111. In the same way as these, as for the other system bandwidths in FIG. 8B, the values of the E-PDCCH-space can be defined.

Figure 9:
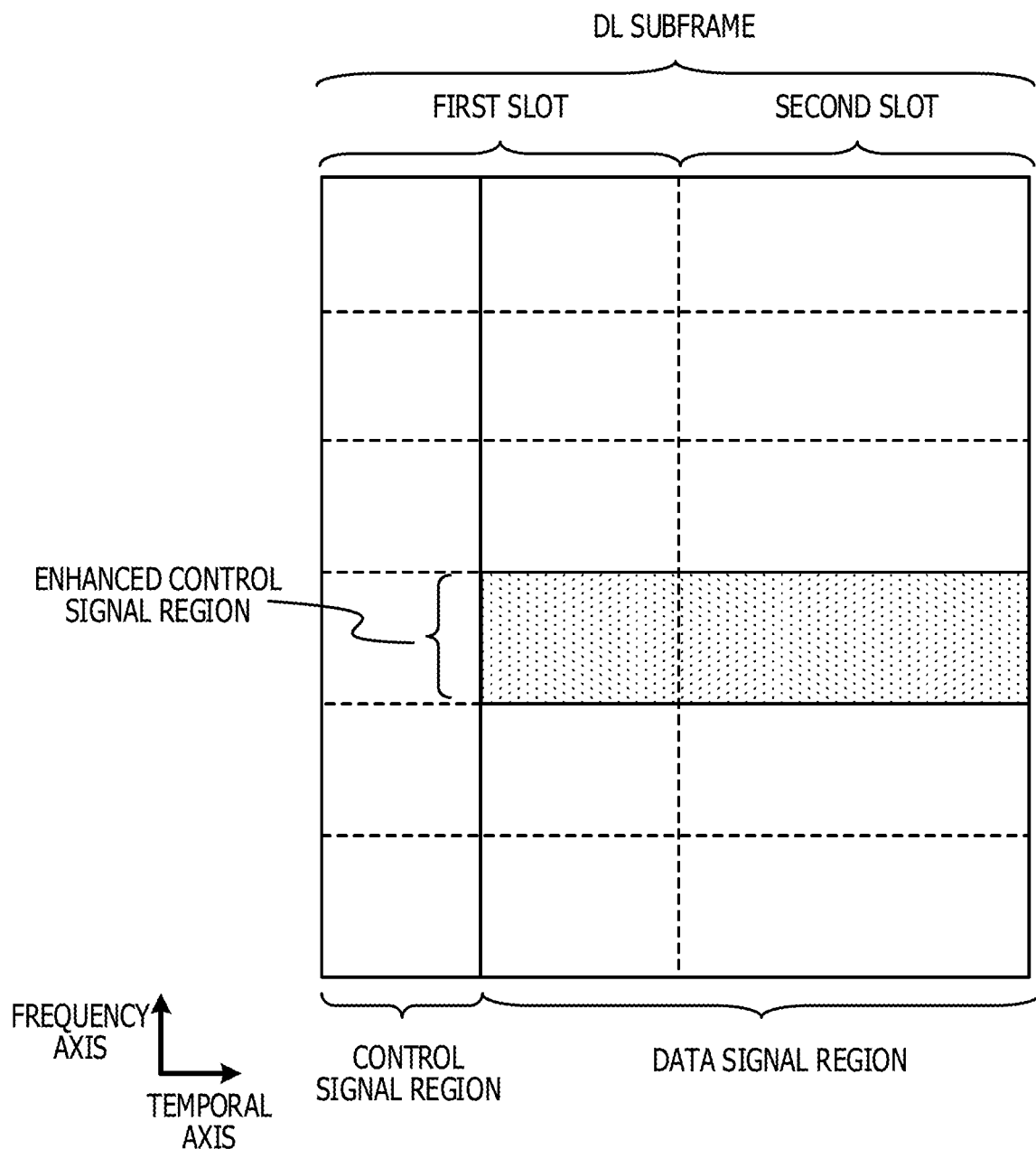
FIG. 9 is a diagram illustrating an example of arrangement of an enhanced control signal region in the wireless communication system according to the second embodiment.

In FIG. 9, an example of arrangement of the enhanced control signal region based on the E-PDCCH-space is illustrated. This example corresponds to a case where the system bandwidth is 1.4 MHz (corresponding to 6 resource blocks) and the E-PDCCH-space is equal to 010. At this time, based on FIG. 8B, a resource block occupied by the enhanced control region is the third resource block from a resource block whose frequency is small (a shaded portion in FIG. 9).

In addition, in FIG. 9, as an example, it is assumed the width of the enhanced control signal region in the frequency direction is a fixed value (here, corresponding to one resource block as an example). This fixed value may correspond to a plurality of blocks and may be a variable value based on, for example, a notification where the wireless base station 10 determines the value thereof and notifies the wireless terminal 20 of the value.

Returning to the description of FIG. 6, in S302, the wireless terminal 20 receives such an MIB as illustrated in, for example, FIG. 8, from the wireless base station 10. From this, in S302, the wireless terminal 20 can obtain information indicating a wireless resource occupied by the enhanced control signal region.

Note that, as an example, the form of the MIB in the second embodiment illustrated in FIG. 8A is a form in which some of spare bits included in the MIB of the related art illustrated in FIG. 7 are used as the enhanced control signal resource information. Specifically, while spare bits of 10 bits are prepared for the MIB in FIG. 7, 1 bit thereof is used as the E-PDCCH-usage and 3 bits thereof are used as the E-PDCCH-space, in the MIB in FIG. 8A. In addition, in the MIB in FIG. 8A, spare bits are 6 bits. From this, the MIB in FIG. 7 and the MIB in FIG. 8A are equal to each other in terms of the size (the number of bits) of information. In this regard, however, since the MIB in FIG. 8A is just an example, the enhanced control resource information may be included in the MIB in the second embodiment, independently of the spare bits.

Next, in S303, the wireless terminal 20 receives the SIB1 from the wireless base station 10. Therefore, in S303, the wireless base station 10 maps the MIB to the PDSCH on the DL subframe, maps the DCI that is information indicating the wireless resource of the relevant PDSCH, to the E-PDCCH on the DL subframe, and transmits the relevant DL subframe.

As described above, since the SIB1 is mapped to the PDSCH, it is desirable that the wireless terminal 20 receives the DCI in order to receive the SIB1. In the processing sequence based on the related art illustrated in FIG. 3, since the wireless terminal 20 does not know a wireless resource occupied by the enhanced control signal region at the time of receiving the SIB1 (S103), the DCI is received and transmitted in a way that the DCI associated with the SIB1 (PDSCH) is mapped to the PDCCH, transmitted. In contrast, in the processing sequence based on the second embodiment illustrated in FIG. 6, since the wireless terminal 20 knows a wireless resource occupied by the enhanced control signal region at the time of receiving the SIB1 (S303) (the enhanced control signal resource information is acquired in S302), the DCI is received and transmitted in a way that the DCI associated with the SIB1 (PDSCH) can be mapped to the E-PDCCH, transmitted, and received.

Upon receiving the DL subframe in S303, the wireless terminal 20 reads the enhanced control signal region on the relevant DL subframe, based on the enhanced control signal resource information included in the MIB received in S302. In addition, the wireless terminal 20 searches for the DCI (E-PDCCH) arranged in the enhanced control signal region and addressed to itself, based on the SI-RNTI that is the common identifier. Finally, based on the searched DCI (E-PDCCH), the wireless terminal 20 can identify the wireless resource of the PDSCH and obtain the SIB1 mapped to the relevant PDSCH.

S304 to S309 in FIG. 6 are processing operations substantially corresponding to S104 to S109 in FIG. 3, respectively. In this regard, however, in S304, S306, and S308 in FIG. 6, the respective DCIs is transmitted and received in a way that the DCI associated with the SIB2, the random access response, and the RRC Connection Setup message are mapped to the E-PDCCHs. Since, in S104, S106, and S108 in FIG. 3, the respective DCIs are mapped to the PDCCHs, the mapping destinations of the DCIs are different. In other points, S304 to S309 in FIG. 6 can be performed in the same way as S104 to S109 in FIG. 3. Here, the detailed description of S304 to S309 will be omitted.

In addition, in a case where a wireless resource occupied by the enhanced control signal region is shared by the connected mode and the idle mode, in FIG. 6 the RRC Reconfiguration Message does not have to be transmitted and received in such a manner as in S110 in FIG. 3 in order to indicate the wireless resource occupied by the enhanced control signal region. The reason is that the MIB including the information that indicates the wireless resource occupied by the enhanced control signal region has already been transmitted and received in S302 in FIG. 6.

S310 and S311 in FIG. 6 are processing operations corresponding to S111 and S112 in FIG. 3, respectively. Here, the detailed description of S310 and S311 will be omitted. From this, the processing sequence illustrated in FIG. 3 is completed.

Note that, in the processing sequence illustrated in FIG. 6, the procedures of S305 to S309 are omitted in a predetermined case. In a case where, for example, at the time of the start of the processing sequence in FIG. 6, the wireless terminal 20 is in the connected mode and the expiration of the term of validity of the system information is detected in S301, the procedures of S305 to S309 are omitted. The reason is that, in such a case, the wireless terminal 20 only has to update the system information (broadcast information).

In the processing sequence illustrated in FIG. 6, in a case where, at the time of the start of the relevant processing sequence, the wireless terminal 20 is currently halted or in the idle mode, the wireless terminal 20 operates as the idle mode, during S301 to S309. However, the wireless terminal 20 can receive (use) the E-PDCCH in S303, S304, S306, and S308. Therefore, according to the processing sequence illustrated in FIG. 6, the wireless terminal 20 in the idle mode can receive (use) the E-PDCCH without making a transition to the connected mode once (while remaining in the idle mode).

In addition, as described above, the MIB (PBCH) is repeatedly transmitted every 10 subframes four times, thereby securing the reliability of transmission and reception. Therefore, even in a case where a plurality of wireless base stations adjacent to one another are operated so as to use the same frequency band or frequency bands whose portions overlap with one another, the reliability of transmission and reception of the MIB (PBCH) is high compared with the PDCCH or the like. Since the reliability of transmission and reception of the enhanced control signal region is required, it is conceivable that transmission and reception performed using information whose reliability is high as the MIB (PBCH) are meaningful.

As described above, in the wireless communication system of the second embodiment, the information (the enhanced control signal resource information) indicating the wireless resource occupied by the enhanced control signal region is included in the MIB. In addition, by receiving such an MIB from the wireless base station 10, the wireless terminal 20 becomes able to receive the E-PDCCH immediately after the reception of the MIB (at the time of the reception of the SIB1). From this, according to the wireless communication system of the second embodiment, the wireless terminal 20 in the idle mode becomes able to receive (use) the E-PDCCH without being put into the connected mode.

Third Embodiment

A third embodiment corresponds to an example of a modification to the second embodiment, and therewithin, a portion of the form of the MIB is modified.

The third embodiment shares many common portions with the second embodiment. Therefore, here, in the third embodiment, portions different from the second embodiment will be mainly described.

FIG. 10 is a diagram explaining an example of the MIB in the third embodiment. FIG. 10A is a diagram illustrating an example of the form of the MIB in the third embodiment. The MIB in the third embodiment illustrated in FIG. 10A includes the E-PDCCH-space serving as a parameter.

FIG. 10B is a diagram illustrating an example of the definition of the E-PDCCH-space in the MIB illustrated in FIG. 10A. The MIB in FIG. 10A does not include the E-PDCCH-usage in such a manner as the MIB in FIG. 8A. Therefore, the MIB in FIG. 10A is defined so that one of values expressed by the E-PDCCH-space indicates "not to use (arrange) the E-PDCCH".

In a case where the E-PDCCH-space illustrated in FIG. 10A is 4 bits of information as an example, FIG. 10B illustrates the definition of the relevant E-PDCCH-space. At this time, the E-PDCCH-space can express 16 kinds of values of 0000 to 1111. For example, E-PDCCH-space=0000 can be defined as indicating "not to use (arrange) the E-PDCCH". In addition, using the remaining 15 kinds of values (0001 to 1111), the E-PDCCH-space can indicate 15 kinds of locations in the enhanced control signal region in the frequency direction in units of resource blocks.

In FIG. 10B, in a case where the system bandwidth is 1.4 MHz (corresponding to 6 resource blocks), the E-PDCCH-space may be defined so as to indicate the respective identifiers, 1 to 6, of the resource blocks whose total number is 6, using the 6 kinds of values of 0001 to 0110. In addition, values, 0111 to 1111, not used here, may be defined as N/A (Not Applicable). On the other hand, in FIG. 10B, in a case where the system bandwidth is 5 MHz (corresponding to 25 resource blocks), the E-PDCCH-space may be defined so as to indicate the respective identifiers of the 15 resource blocks of 1, 3, 4, 6, 8, 9, 11, 13, 14, 16, 18, 19, 21, 23, and 24 among total resource block of 25, using the 15 kinds of values of 0001 to 1111. In the same way as these, as for the other system bandwidths in FIG. 10B, the values of the E-PDCCH-space may be defined.

As described above, according to the wireless communication system of the third embodiment, it is possible to obtain the same advantageous effect as that of the second embodiment. In other words, in the wireless communication system of the third embodiment, the information (the enhanced control signal resource information) indicating the wireless resource occupied by the enhanced control signal region is included in the MIB. In addition, by receiving such an MIB from the wireless base station 10, the wireless terminal 20 becomes able to receive the E-PDCCH immediately after the reception of the MIB (at the time of the reception of the SIB1). From this, according to the wireless communication system of the second embodiment, the wireless terminal 20 in the idle mode becomes able to receive (use) the E-PDCCH without being transmit to the connected mode.

In a case where the size (the number of bits) of the enhanced control signal resource information is the same, it is possible to identify more kinds of wireless resources (resource blocks) in the third embodiment, compared with the second embodiment.

Fourth Embodiment

In a fourth embodiment, the enhanced control signal information is transmitted and received in the synchronization signal. The fourth embodiment shares many common portions with the second embodiment. Therefore, here, in the fourth embodiment, portions different from the second embodiment will be mainly described.

As described in S101 in FIG. 3 based on the related art, the wireless terminal 20 in the idle mode can receive the synchronization signal, and the wireless terminal 20 can identify a cell ID, based on the synchronization signal. While the detail thereof will be omitted, the wireless terminal 20 can identify one of 504 kinds of cell IDs, based on the received synchronization signal. In other words, information can be placed on the synchronization signal.

In the fourth embodiment, it is assumed that the enhanced control signal resource information is placed on this synchronization signal. For example, a method in which it is conceivable that the size of the information to be placed on the synchronization signal is not changed from that of the related art. As an example, the enhanced control signal information may be set to 2 bits and the cell ID may be set to 126 kinds. In addition, for example, a method in which it is conceivable that the size of the information to be placed on the synchronization signal is increased from that of the related art. As an example, the enhanced control signal information may be set to 2 bits and the cell ID may be set to 504 kinds. In this case, it is desirable that the wireless terminal 20 is able to identify 2016 kinds of patterns from the synchronization signal.

According to the fourth embodiment, since the enhanced control signal resource information is placed on the synchronization signal serving as a signal receivable even by the wireless terminal 20 in the idle mode, transmitted, and received, the wireless terminal 20 in the idle mode becomes able to receive (use) the E-PDCCH in such a manner as the other embodiments.

Fifth Embodiment

In a fifth embodiment, the enhanced control signal information is transmitted and received in the reference signal. The fifth embodiment shares many common portions with the second embodiment. Therefore, here, in the fifth embodiment, portions different from the second embodiment will be mainly described.

As described in S102 in FIG. 3 based on the related art, the wireless terminal 20 in the idle mode can receive the reference signal, and the wireless terminal 20 can perform estimation of a channel characteristic or the like, based on the reference signal. In addition, the reference signal is used for measurement of reception power or the like, and based on the measured reception power, cell selection (including cell reselection) or selection of a target cell in handover is performed.

As the sequence of the reference signal, the same 504 kinds as those of the cell IDs are prepared. The 504 kinds of sequences are obtained by combination of 6 kinds of arrangement patterns and 84 kinds of signal patterns. The wireless terminal 20 identifies a cell ID from the synchronization signal, identifies the sequence of the reference signal, based on the relevant cell ID, and performs channel estimation, reception power measurement, and so forth, based on the identified arrangement pattern and signal pattern.

Since the signal pattern of the reference signal is used for the channel estimation, it is difficult to simply place information thereon in such a manner as the synchronization signal. However, in the fifth embodiment, as an example, the enhanced control signal information can be set to one bit, and the wireless base station 10 can be caused to transmit one of a signal pattern itself or a reverse pattern of the signal pattern, in accordance with the enhanced control signal information. From this, by estimating whether the received reference signal is the signal pattern itself or the reverse pattern of the signal pattern, the wireless terminal 20 becomes able to receive the one bit of enhanced control signal information, based on the reference signal.

In addition, it is conceivable to place information in the amplitude direction of the reference signal. As described above, since the reference signal is used for the reception power measurement, it is difficult to simply place information in the amplitude direction. However, in the fifth embodiment, as an example, the enhanced control signal information can be set to one bit, and in accordance with a specified timing, the wireless base station 10 can change the amplitude of the reference signal in two ways (for example, sending the reference signal as usual and powering off). From this, in accordance with the transmission power of the received reference signal, the wireless terminal 20 becomes able to receive the one bit of enhanced control signal information, based on the reference signal.

According to the fifth embodiment, since the enhanced control signal resource information is placed on the reference signal serving as a signal receivable even by the wireless terminal 20 in the idle mode, transmitted, and received, the wireless terminal 20 in the idle mode becomes able to receive (use) the E-PDCCH in such a manner as the other embodiments.

Sixth Embodiment

A sixth embodiment is an example of a modification applicable to any one of the first to fifth embodiments.

In the first to fifth embodiments, it is assumed that the length of the enhanced control signal region in the temporal axis direction is a fixed value. In the sixth embodiment, the length of the enhanced control signal region in the temporal axis direction is dynamically changed.

Hereinafter, the outline of processing of the sixth embodiment will be described based on the second embodiment (FIG. 6). In the same way as this, the sixth embodiment is applicable to the first embodiment and the third to fifth embodiments.

The dynamic changing of the length of the enhanced control signal region in the temporal axis direction can be realized by applying, for example, the way of thinking of the PCFICH (described in S103 in FIG. 3) that is a physical channel to which information indicating the length of the control signal region in the temporal axis direction is mapped. Here, it is assumed that a physical channel to which the information indicating the width of the enhanced control signal region in the temporal axis direction (for the sake of convenience, called enhanced control signal region size information) is to be mapped is called E-PCFICH.

While, in the same way as the PCFICH, the E-PCFICH can be arranged at a predetermined location of the control signal region, but in that case the wireless terminal 20 has to receive the control signal region in order to receive the enhanced control signal region (E-PDCCH). Therefore, the case is undesirable from the viewpoint of the above-mentioned problem. Therefore, for example, a portion of a resource used by the related art as the PBCH to which the MIB is mapped can be allocated as the E-PCFICH.

In addition, without providing the individual physical channel of the E-PCFICH, the enhanced control signal region size information may be mapped to an existing physical channel. The enhanced control signal region size information may be mapped to, for example, the PBCH. This can be realized by causing the enhanced control signal region size information to be included in the MIB. In addition, the enhanced control signal region size information may be placed on the synchronization signal or the reference signal.

By introducing the enhanced control signal region size information, it is possible to dynamically change the length of the enhanced control signal region in the temporal axis direction. From this, it becomes possible to increase or decrease the size of the enhanced control signal region and an advantageous effect that improves the convenience of the enhanced control signal region (E-PDCCH) is obtained.

Seventh Embodiment

In a seventh embodiment, the enhanced control signal region is arranged in a predetermined region in the DL frame or the DL subframe.

In FIG. 11, an example of the DL subframe in the seventh embodiment is illustrated. As an example, FIG. 11 illustrates the initial DL subframe (the first DL subframe) of the DL frame (10 DL subframes). As illustrated in FIG. 11, in the DL subframe, the S-SCH, the P-SCH, and the PBCH are arranged in the band of six resource blocks located anterior and posterior to the center frequency. At this time, as illustrated in FIG. 11, in the band of six resource blocks, the enhanced control signal region can be arranged in regions located anterior and posterior to the S-SCH, the P-SCH, and the PBCH in the temporal axis (in this regard, however the control signal region is excluded).

Here, it is assumed that a wireless resource in the seventh embodiment, in which the enhanced control signal region is arranged, is predefined as is the case with the S-SCH, the P-SCH, and the PBCH. From this, the wireless terminal 20 becomes able to receive the E-PDCCH without receiving control signal indicating a wireless resource in which the enhanced control signal region is arranged.

Note that, as described before, FIG. 11 is just an example of the enhanced control signal region in the wireless communication system according to the seventh embodiment. In the seventh embodiment, the enhanced control signal region may be arranged in, for example, predetermined DL subframes (some or all) without limitation to the initial DL subframe in the DL frame. In addition, in the seventh embodiment, the enhanced control signal region may be arranged in, for example, a predetermined band (whole or part) without limitation to the band of six resource blocks located anterior and posterior to the center frequency in the DL subframe.

Other Embodiments

In the sixth embodiment, the length of the enhanced control signal region in the temporal axis direction is set to a variable value. In contrast, using the same method, the length of the enhanced control signal region in the frequency axis direction may be set to a variable value. This can be applied to each of the first to fifth embodiments.

[Network Configuration of Wireless Communication System of Each Embodiment]

Figure 12:
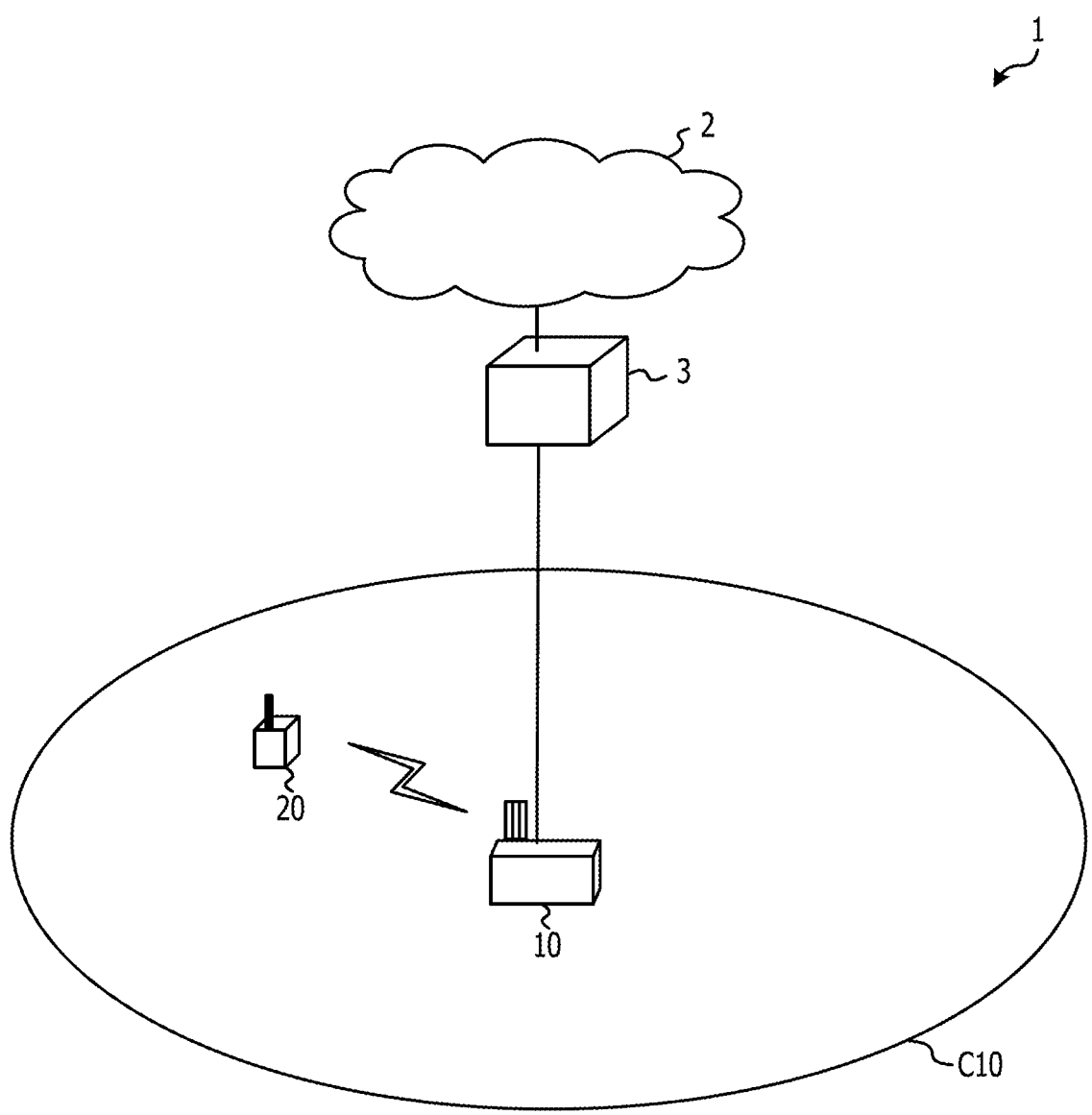
FIG. 12 is a diagram illustrating a configuration of a wireless communication system according to each embodiment.

Next, based on FIG. 12, the network configuration of a wireless communication system 1 of each embodiment will be described. As illustrated in FIG. 12, the wireless communication system 1 includes the wireless base station 10 and the wireless terminal 20. The wireless base station 10 forms a cell C10. The wireless terminal 20 exists in the cell C10. In addition, note that, in the present application, the wireless base station 10 and the wireless terminal 20 are collectively called "wireless stations" in some cases.

The wireless base station 10 is connected to a network device 3 through a wired connection, and the network device 3 is connected to a network 2 through a wired connection. The wireless base station 10 is provided so as to be able to transmit and receive data and control information to and from another wireless base station through the network device 3 and the network 2.

As for the wireless base station 10, a wireless communication function with the wireless terminal 20 and digital signal processing and control functions may be separated from each other and put into different devices. In this case, a device equipped with the wireless communication function is called an RRH (Remote Radio Head), and a device, equipped with the digital signal processing and control functions, is called a BBU (Base Band Unit). The RRH may be installed so as to project from the BBU, and a wired connection may be established therebetween using an optical fiber or the like. In addition, the wireless base station 10 may be one of wireless base stations of various sizes in addition to small wireless base stations such as a macro wireless base station and a pico wireless base station (including a micro wireless base station, a femto wireless base station, and so forth). In addition, in a case where a relay station that relays wireless communication between the wireless base station 10 and the wireless terminal 20 is used, the relevant relay station (transmission and reception to and from the wireless terminal 20 and the control thereof) may be included in the wireless base station 10 of the present application.

On the other hand, the wireless terminal 20 communicates with the wireless base station 10 using wireless communication.

The wireless terminal 20 may be one of a mobile phone, a smartphone, a PDA (Personal Digital Assistant), a personal computer (Personal Computer), and wireless terminals such as various kinds of devices or apparatuses (sensor devices and so forth) equipped with wireless communication functions. In addition, in a case where a relay station that relays wireless communication between the wireless base station 10 and the wireless terminal is used, the relevant relay station (transmission and reception to and from the wireless base station 10 and the control thereof) may be included in the wireless terminal 20 of the present manuscript.

The network device 3 includes, for example, a communication unit and a control unit, and these individual configuration portions are connected so as to be able to input and output signals and data unidirectionally or bidirectionally. The network device 3 is realized by, for example, a gateway. As the hardware configuration of the network device 3, for example, the communication unit is realized by an interface circuit and the control unit is realized by a processor and a memory.

In addition, the specific form of the distribution or integration of individual configuration elements of the wireless base station and wireless terminal is not limited to the form of the first embodiment, and all or part thereof may be functionally or physically distributed or integrated in arbitrary units and configured according to various loads, various statuses of use, and so forth. For example, a memory may be connected, as an external device of the wireless base station or the wireless terminal, through a network or a cable.

[Functional Configuration of Each Device in Wireless Communication System of Each Embodiment]

Next, based on FIG. 13 and FIG. 14, the functional configuration of each device in the wireless communication system of each embodiment will be described.

Figure 13:
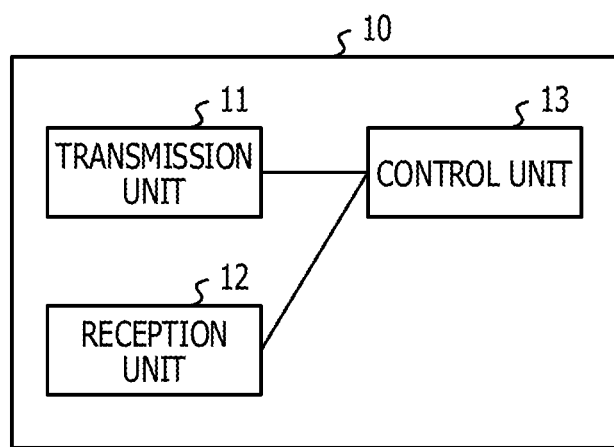
FIG. 13 is a functional block diagram illustrating a configuration of a wireless base station according to each embodiment.

FIG. 13 is a functional block diagram illustrating the configuration of the wireless base station 10. As illustrated in FIG. 13, the wireless base station 10 includes a transmission unit 11, a reception unit 12, and a control unit 13. These individual configuration portions are connected so as to be able to input and output signals and data unidirectionally or bidirectionally.

The transmission unit 11 transmits a data signal and a control signal through an antenna using wireless communication. In addition, the antenna may be shared by transmission and reception. The transmission unit 11 transmits a downlink signal through, for example, a downlink data channel or a downlink control channel. A downlink physical data channel includes, for example, the PDSCH (Physical Downlink Shared Channel) serving as an individual data channel. In addition, a downlink physical control channel includes, for example, the PDCCH (Physical Downlink Control Channel) serving as an individual control channel. The transmitted signal includes, for example, an L1/L2 control signal transmitted on the individual control channel to the wireless terminal 20 in the connected state, and a user data signal and an RRC (Radio Resource Control) control signal, transmitted on the individual data channel to the wireless terminal 20 in the connected state. In addition, the transmitted signal includes, for example, the synchronization signal, the reference signal, and so forth in addition to the MIB transmitted on the PBCH. As a specific example of the transmitted signal, individual downlink signals transmitted from the wireless base station toward the wireless terminal in FIG. 5 or FIG. 6 may be cited. In addition, as a specific example of the transmitted signal, the MIB illustrated in FIG. 8A or FIG. 10A may be cited.

The reception unit 12 receives a data signal and a control signal, transmitted from the wireless terminal 20, through the antenna using wireless communication. The reception unit 12 receives an uplink signal through, for example, an uplink data channel or an uplink control channel. An uplink physical data channel includes, for example, the PUSCH (Physical Uplink Shared Channel) serving as an individual data channel. In addition, an uplink physical control channel includes, for example, the PUCCH (Physical Uplink Control Channel) serving as an individual control channel. The received signal includes, for example, the L1/L2 control signal transmitted on the individual control channel from the wireless terminal 20 in the connected state, and a user data signal and an RRC (Radio Resource Control) control signal, transmitted on the individual data channel from the wireless terminal 20 in the connected state. In addition, the received signal includes, for example, the reference signal. As a specific example of the received signal, individual uplink signals transmitted from the wireless terminal toward the wireless base station in FIG. 5 or FIG. 6 may be cited.

The control unit 13 outputs, to the transmission unit 11, the data and control information, which are to be transmitted. The control unit 13 inputs the received data and control information from the reception unit 12. The control unit 13 acquires data and control information from the network device 3 or another wireless base station through a wired connection or a wireless connection.

In addition to these, the control unit performs various kinds of control relating to various kinds of transmission signals to be transmitted by the transmission unit 11 and various kinds of reception signals received by the reception unit. As a specific example of control performed by the control unit 13, control relating to processing performed by the wireless base station in FIG. 5 or FIG. 6 may be cited.

Figure 14:
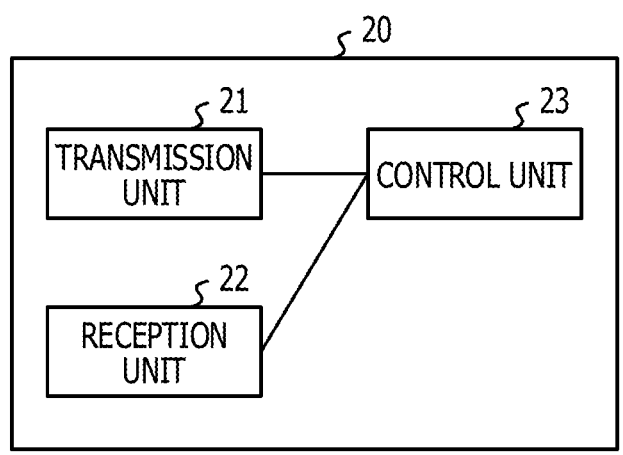
FIG. 14 is a functional block diagram illustrating a configuration of a wireless terminal according to each embodiment.

FIG. 14 is a functional block diagram illustrating the configuration of the wireless terminal 20. As illustrated in FIG. 14, the wireless terminal 20 includes a transmission unit 21, a reception unit 22, and a control unit 23. These individual configuration portions are connected so as to be able to input and output signals and data unidirectionally or bidirectionally.

The transmission unit 21 transmits a data signal and a control signal through an antenna using wireless communication. In addition, the antenna may be shared by transmission and reception. The transmission unit 21 transmits an uplink signal through, for example, an uplink data channel or an uplink control channel. An uplink physical data channel includes, for example, the PUSCH serving as an individual data channel. In addition, an uplink physical control channel includes, for example, the PUCCH serving as an individual control channel. The transmitted signal includes, for example, an L1/L2 control signal transmitted on the individual control channel to the currently connected wireless base station 10, and a user data signal and an RRC (Radio Resource Control) control signal, transmitted on the individual data channel to the currently connected wireless base station 10. In addition, the transmitted signal includes, for example, the reference signal. As a specific example of the transmitted signal, individual uplink signals transmitted from the wireless terminal toward the wireless base station in FIG. 5 or FIG. 6 may be cited.

The reception unit 22 receives a data signal and a control signal, transmitted from the wireless base station 10, through the antenna using wireless communication. The reception unit 22 receives a downlink signal through, for example, a downlink data channel or a downlink control channel. A downlink physical data channel includes, for example, the PDSCH serving as an individual data channel. In addition, a downlink physical control channel includes, for example, the PDCCH serving as an individual control channel. The received signal includes, for example, the L1/L2 control signal transmitted on the individual control channel from the currently connected wireless base station 10, and a user data signal and an RRC (Radio Resource Control) control signal, transmitted on the individual data channel from the currently connected wireless base station 10. In addition, the received signal includes, for example, the synchronization signal, the reference signal, and so forth in addition to the MIB transmitted on the PBCH. As a specific example of the received signal, individual downlink signals transmitted from the wireless base station toward the wireless terminal in FIG. 5 or FIG. 6 may be cited. In addition, as a specific example of the received signal, the MIB illustrated in FIG. 8A or FIG. 10A may be cited.

The control unit 23 outputs, to the transmission unit 21, data and control information, which are to be transmitted. The control unit 23 inputs the received data and control information from the reception unit 22. In addition to these, the control unit 23 performs various kinds of control relating to various kinds of transmission signals to be transmitted by the transmission unit 21 and various kinds of reception signals received by the reception unit 22. As a specific example of control performed by the control unit 13, control relating to processing performed by the wireless base station in FIG. 5 or FIG. 6 may be cited.

[Hardware Configuration of Each Device in Wireless Communication System of Each Embodiment]

Finally, based on FIG. 15 and FIG. 16, the hardware configuration of each device in the wireless communication system of the first embodiment will be described.

Figure 15:
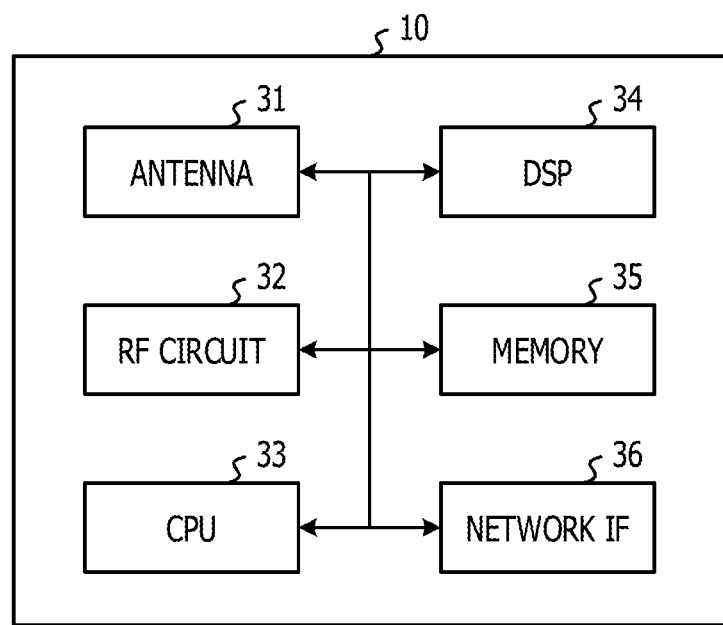
FIG. 15 is a diagram illustrating a hardware configuration of the wireless base station according to each embodiment.

FIG. 15 is a diagram illustrating the hardware configuration of the wireless base station 10. As illustrated in FIG. 15, as the configuration elements of the hardware, the wireless base station 10 includes, for example, an RF (Radio Frequency) circuit 32 equipped with an antenna 31, a CPU (Central Processing Unit) 33, a DSP (Digital Signal Processor) 34, a memory 35, and a network IF (Interface) 36. The CPU is connected so as to be able to input and output various kinds of signals and data through the network IF 36 such as a switch. The memory 35 includes, for example, at least one of a RAM (Random Access Memory) such as an SDRAM (Synchronous Dynamic Random Access Memory), a ROM (Read Only Memory), and a flash memory and stores therein a program, control information, and data. The transmission unit 11 and the reception unit 12 are realized by, for example, the RF circuit 32 or the antenna 31 and the RF circuit 32. The control unit 13 is realized by, for example, the CPU 33, the DSP 34, the memory 35, a digital electronic circuit not illustrated, and so forth. As the digital electronic circuit, for example, an ASIC (Application Specific Integrated Circuit), an FPGA (Field-Programming Gate Array), an LSI (Large Scale Integration), and so forth may be cited.

Figure 16:
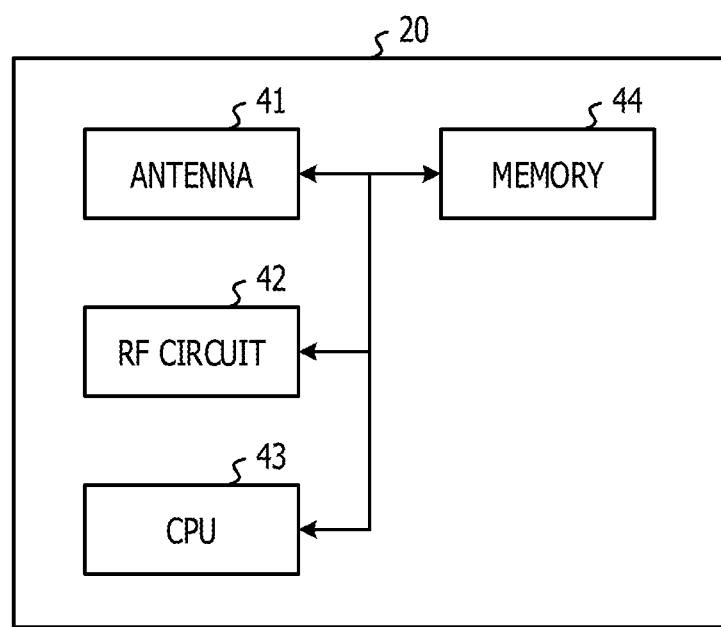
FIG. 16 is a diagram illustrating a hardware configuration of the wireless terminal according to each embodiment.

FIG. 16 is a diagram illustrating the hardware configuration of the wireless terminal 20. As illustrated in FIG. 16, as the configuration elements of the hardware, the wireless terminal 20 includes, for example, an RF circuit 42 equipped with an antenna 41, a CPU 43, and a memory 44. Furthermore, the wireless terminal 20 may include a display device such as an LCD (Liquid Crystal Display) connected to the CPU 43. The memory 44 includes, for example, at least one of a RAM such as an SDRAM, a ROM, and a flash memory and stores therein a program, control information, and data. The transmission unit 21 and the reception unit 22 are realized by, for example, the RF circuit 42 or the antenna 41 and the RF circuit 42. The control unit 23 is realized by, for example, the CPU 43, the memory 44, a digital electronic circuit not illustrated, and so forth. As the digital electronic circuit, for example, an ASIC, an FPGA, an LSI, and so forth may be cited.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method comprising:
   transmitting, from a wireless base station, periodic system information mapped to a Physical Broadcast Channel (PBCH), the periodic system information including resource information directly indicating at least one of a sub-frame index, frequency component, and a resource block corresponding to a resource location of an Enhanced-Physical Downlink Control Channel (E-PDCCH), the resource information being constituted by a plurality of bits and being stored in a field of the periodic system information, the field being recognized as spare bits by a first wireless terminal that does not support accessing the E-PDCCH directly indicated by the resource information, the first wireless terminal being configured to ignore the spare bits;
   receiving, by a second wireless terminal in at least one of an idle mode and a connected mode that supports accessing the E-PDCCH directly indicated by the resource information, the periodic system information mapped to the PBCH that is transmitted from the wireless base station;
   searching for, by the second wireless terminal, control information mapped to the E-PDCCH directly indicated by the resource information in the periodic system information, the control information indicating a wireless resource of a Physical Downlink Shared Channel (PDSCH); and
   determining, by the second wireless terminal, a wireless resource of the PDSCH based on the control information.

2. The wireless communication method according to claim 1, wherein the E-PDCCH directly indicated by the resource information corresponds with an Enhanced-Physical Downlink Control Channel (E-PDCCH) in Long Term Evolution (LTE) standard.

3. A wireless communication system comprising:
   a wireless base station configured to transmit periodic system information mapped to a Physical Broadcast Channel (PBCH), the periodic system information including resource information directly indicating at least one of a sub-frame index, frequency component, and a resource block corresponding to a resource location of an Enhanced-Physical Downlink Control Channel (E-PDCCH), the resource information being constituted by a plurality of bits and being stored in a field of the periodic system information, the field being recognized as spare bits by a first wireless terminal that does not support accessing the E-PDCCH directly indicated by the resource information, the first wireless terminal being configured to ignore the spare bits; and a second wireless terminal, that supports accessing the E-PDCCH directly indicated by the resource information, configure to:

receive in at least one of an idle mode and a connected mode the periodic system information mapped to the PBCH that is transmitted from the wireless base station;

search for control information mapped to the E-PDCCH directly indicated by the resource information in the periodic system information, the control information indicating a wireless resource of a Physical Downlink Shared Channel (PDSCH); and determine a wireless resource of the PDSCH based on the control information.

4. The wireless communication system according to claim 3, wherein
the E-PDCCH directly indicated by the resource information corresponds with an Enhanced-Physical Downlink Control Channel (E-PDCCH) in LTE standard.

5. A wireless terminal comprising:
a memory; and
a processor coupled to the memory and configured
to receive, from a wireless base station, periodic system information mapped to a Physical Broadcast Channel (PBCH), the periodic system information including resource information directly indicating at least one of a sub-frame index, frequency component, and a resource block corresponding to a resource location of an Enhanced-Physical Downlink Control Channel (E-PDCCH), the resource information being constituted by a plurality of bits and being stored in a field of the periodic system information, wherein when the wireless terminal does not support accessing the E-PDCCH directly indicated by the resource information, the field of the periodic system information is recognized as spare bits and the wireless terminal is configured to ignore the spare bits, and when the wireless terminal in at least one of an idle mode and a connected mode supports accessing the E-PDCCH directly indicated by the resource information, the processor coupled to the memory is configured to search for control information mapped to the E-PDCCH directly indicated by the resource information in the periodic system information, the control information indicating a wireless resource of a Physical Downlink Shared Channel (PDSCH), and determine a wireless resource of the PDSCH based on the control information.

6. The wireless terminal according to claim 5, wherein
the E-PDCCH directly indicated by the resource information corresponds with an Enhanced-Physical Downlink Control Channel (E-PDCCH) in LTE standard.

7. A wireless base station comprising:
a memory; and
a processor coupled to the memory and configured to
transmit a signal in periodic system information mapped to a Physical Broadcast Channel (PBCH), the periodic system information including resource information directly indicating at least one of a sub-frame index, frequency component, and a resource block corresponding to a resource location of an Enhanced-Physical Downlink Control Channel (E-PDCCH), the resource information being constituted by a plurality of bits and being stored in a field of the periodic system information, the field being recognized as spare bits by a first wireless terminal that does not support accessing the E-PDCCH directly indicated by the resource information, the first wireless terminal being configured to ignore the spare bits, and wherein the E-PDCCH directly indicated by the resource information includes control information indicating a wireless resource of a Physical Downlink Shared Channel (PDSCH) to a second wireless terminal, the second wireless terminal in at least one of an idle mode and a connected mode being configured to support accessing the E-PDCCH directly indicated by the resource information, that receives the periodic system information.

8. The wireless base station according to claim 7, wherein
the E-PDCCH directly indicated by the resource information corresponds with an Enhanced-Physical Downlink Control Channel (E-PDCCH) in LTE standard.

9. A wireless communication system comprising:
a wireless base station configured to transmit periodic system information mapped to a Physical Broadcast Channel (PBCH), the periodic system information including resource information indicating at least one of a sub-frame index, frequency component, and a resource block corresponding to a resource location of an Enhanced-Physical Downlink Control Channel (E-PDCCH), the resource information being constituted by a plurality of bits and being stored in a field of the periodic system information;

a first wireless terminal, that does not support accessing the E-PDCCH directly indicated by the resource information, configured to recognize as spare bits the E-PDCCH directly indicated by the resource information, and configured to ignore the spare bits; and a second wireless terminal, in at least one of an idle mode and a connected mode, that supports accessing the E-PDCCH directly indicated by the resource information, configured to:

receive the periodic system information mapped to the PBCH that is transmitted from the wireless base station:

search for control information mapped to the E-PDCCH directly indicated by the resource information in the periodic system information, the control information indicating a wireless resource of a Physical Downlink Shared Channel (PDSCH); and determine a wireless resource of the PDSCH based on the control information.

\* \* \* \* \*